(12) United States Patent
Whitham

(10) Patent No.: US 10,731,385 B2
(45) Date of Patent: Aug. 4, 2020

(54) BED ILLUMINATION AND TAILGATE LOCK SYSTEM

(71) Applicant: Bradley Roll Whitham, Kingwood, TX (US)

(72) Inventor: Bradley Roll Whitham, Kingwood, TX (US)

(*) Notice: Subject to any disclaimer, the term of this patent is extended or adjusted under 35 U.S.C. 154(b) by 23 days.

(21) Appl. No.: 15/964,513

(22) Filed: Apr. 27, 2018

(65) Prior Publication Data
US 2018/0313117 A1 Nov. 1, 2018

Related U.S. Application Data

(60) Provisional application No. 62/492,141, filed on Apr. 29, 2017.

(51) Int. Cl.
| E05B 77/00 | (2014.01) |
| B62D 33/027 | (2006.01) |
| B60Q 1/30 | (2006.01) |
| B60Q 1/00 | (2006.01) |
| E05B 83/00 | (2014.01) |
| E05B 83/16 | (2014.01) |
| E05B 17/10 | (2006.01) |
| E05B 81/54 | (2014.01) |
| E05B 81/76 | (2014.01) |
| E05B 81/08 | (2014.01) |
| B60Q 1/44 | (2006.01) |
| E05B 81/04 | (2014.01) |
| E05B 47/00 | (2006.01) |

(52) U.S. Cl.
CPC ............ *E05B 77/00* (2013.01); *B60Q 1/0088* (2013.01); *B60Q 1/305* (2013.01); *B60Q 1/307* (2013.01); *B62D 33/0273* (2013.01); *E05B 17/10* (2013.01); *E05B 81/08* (2013.01); *E05B 81/54* (2013.01); *E05B 81/76* (2013.01); *E05B 83/00* (2013.01); *E05B 83/16* (2013.01); *B60Q 1/44* (2013.01); *E05B 81/04* (2013.01); *E05B 2047/0094* (2013.01); *E05Y 2201/434* (2013.01); *E05Y 2400/30* (2013.01); *E05Y 2400/85* (2013.01); *E05Y 2900/546* (2013.01)

(58) Field of Classification Search
CPC ............................... B62D 63/08; B62D 61/08
USPC ........ 296/5, 146.6, 102, 2, 25, 26.03, 97.21; 280/163, 166, 29, 47.41, 793, 87.021, 280/87.051
See application file for complete search history.

(56) References Cited

U.S. PATENT DOCUMENTS 8,838,333 B2 * 9/2014 Cheal ....................... B60J 5/103
296/146.8
9,725,069 B2 * 8/2017 Krishnan ................ H04W 4/80
(Continued)

*Primary Examiner* — D Glenn Dayoan
*Assistant Examiner* — Sunsurraye Westbrook
(74) *Attorney, Agent, or Firm* — Christopher A. Proskey; BrownWinick Law Firm

(57) ABSTRACT

A bed illumination and tailgate lock system is presented that includes a bed light and tailgate lock controller connected to a bed light system and a tailgate lock system and tailgate pull handle actuator. The bed light and tailgate lock controller is electrically connected to the wiring system of a vehicle and receives control signals, in the form of power being sent to the brake lights, and in response to receiving these control signals bed light and tailgate lock controller locks and unlocks the tailgate and illuminates the bed of the vehicle.

18 Claims, 10 Drawing Sheets

(56) References Cited

U.S. PATENT DOCUMENTS

| | | | | |
|---|---|---|---|---|
| 2003/0189481 A1* | 10/2003 | Hamid | ............... | G07C 9/00182 |
| | | | | 340/5.53 |
| 2015/0019046 A1* | 1/2015 | Jang | ........................ | E05F 15/77 |
| | | | | 701/2 |
| 2016/0332563 A1* | 11/2016 | Tseng | ................... | B60Q 1/0041 |
| 2017/0313244 A1* | 11/2017 | Luciew | .................... | B60Q 3/62 |
| 2018/0312112 A1* | 11/2018 | Lewis | ..................... | B60R 1/003 |

* cited by examiner

BED ILLUMINATION AND TAILGATE LOCK SYSTEM

CROSS REFERENCE TO RELATED APPLICATIONS

This application claims benefit to U.S. Patent and Trademark Office Provisional Application No. 62/492,141 which was filed on Apr. 29, 2017, the entirety of which is incorporated herein fully by reference.

FIELD OF THE DISCLOSURE

This disclosure relates to vehicles. More specifically, and without limitation, this disclosure relates to pickup trucks that have tailgates or other vehicles that have lockable doors or components.

BACKGROUND OF THE INVENTION

Vehicles are old and well known. Countless forms of vehicle exist such as sedans, sports cars, vans, sport utility vehicles, pickup trucks, panel trucks, and the list goes on. Each particular configuration is designed for a particular purpose. Each particular configuration provides its own unique advantages and is particularly well suited for certain uses. However, each particular configuration provides its own unique disadvantages and has its own shortcomings.

One popular form of vehicles is known as a pickup truck. Pickup trucks come in a great variety of sizes, shapes and configurations themselves however common components include a main body, having a cab that houses the user controls, such as a steering wheel, gas pedal, brake pedal, door locks, window controls, and other components. Pickup trucks also include a bed that is enclosed by a forward wall, fenders and a tailgate.

Pickup trucks are tremendously useful vehicles because of the bed. The bed allows pickup trucks to hold and haul bulk items with relative ease and convenience.

The functionality of pickup trucks is also greatly enhanced by the tailgate which can be quickly and easily moved between a closed position, wherein the tailgate closes the rearward end of the bed, and a lowered position, wherein the tailgate is lowered and essentially extends the length of the bed allowing for longer objects to hang outward from the end of the bed. Tailgates can also be quickly and easily removed thereby increasing the functionality further by eliminating the tailgate in situations where it is not needed or in the way.

While pickup trucks are highly functional, the configuration of pickup trucks suffer from a number of substantial deficiencies. One substantial deficiency of pickup trucks is that the bed is often dimly illuminated, if illuminated at all. Another substantial deficiency of pickup trucks is that the tailgate can be easily stolen or vandalized because the tailgate is so easy to remove. Another substantial deficiency of pickup trucks is that operation of the tailgate is often manual in nature.

To address the problem of the pickup truck bed being dimly illuminated a number of pickup truck bed light kits have been developed. These light kits tend to include one or more lights that are installed in particular arrangements within the bed. The lights are then connected to the vehicle wiring system to provide power and ground.

While these light kits do improve illumination of the pickup truck bed, these light kits suffer from a great number of disadvantages. Namely, existing light kits are difficult and time consuming to install, existing light kits require running wiring into the cab of the pickup truck or under the hood to connect to power and ground, and once installed, it is difficult or inconvenient to control illumination of the lights, and the lights can only be controlled in a limited number of ways. Furthermore, adding a pickup truck bed light kit does not address the problems associated with locking and unlocking a tailgate. For these reasons, and many more, existing pickup truck bed light kits leave much to be desired.

To address the problem of the tailgate being stolen, a number of tailgate locks have been developed. Existing tailgate lock systems can be broken down into two primary categories, manual tailgate locks and powered tailgate locks.

Manual tailgate locks require installation of a mechanical lock that requires a key to lock and unlock the tailgate. These manual tailgate locks work for their intended purpose. However these manual tailgate locks suffer from a great number of disadvantages. Namely, existing manual tailgate lock systems are complicated, time consuming and inconvenient to install. In addition, manual tailgate lock systems are undesirable because the operator must retain the key that locks and unlocks the manual tailgate lock. A substantial problem arises if the key is lost or not present when the tailgate needs to be lowered. Another substantial disadvantage to manual tailgate locks is that it requires substantial manual effort for the user to lock and unlock the tailgate which is undesirable. Another substantial disadvantage to manual tailgate locks is that the tailgate cannot be locked or unlocked remotely. For these reasons, and many more, manual tailgate locks leave much to be desired.

Powered tailgate locks provide the benefit that the powered lock can be actuated remotely, which improves convenience for the user. While powered tailgate locks provide added convenience over manual tailgate locks, existing powered tailgate locks suffer from a great number of disadvantages. Namely, existing powered tailgate lock systems are complicated, time consuming and inconvenient to install. In addition, existing powered tailgate locks require running wiring into the cab of the pickup truck or under the hood to connect to power and ground. Another problem associated with existing powered tailgate locks is that once installed, it is difficult or inconvenient to control the lock. Furthermore, adding a tailgate lock does not address the illumination problem. For these reasons, and many more, existing pickup truck tailgate locks, whether manual or powered, leave much to be desired.

Therefore, in view of the disadvantages in the prior art, for the reasons stated above, and for other reasons stated below which will become apparent to those skilled in the art upon reading and understanding the specification, claims and drawings there is a need in the art for a bed illumination and tailgate lock system.

Thus, it is a primary object of the disclosure to provide a bed illumination and tailgate lock system that improves upon the state of the art.

Another object of the disclosure is to provide a bed illumination and tailgate lock system that has a long useful life.

Yet another object of the disclosure is to provide a bed illumination and tailgate lock system that can be used on practically any pickup truck.

Another object of the disclosure is to provide a bed illumination and tailgate lock system that is easy to install.

Yet another object of the disclosure is to provide a bed illumination and tailgate lock system that improves efficiency.

Another object of the disclosure is to provide a bed illumination and tailgate lock system that is easy to use.

Yet another object of the disclosure is to provide a bed illumination and tailgate lock system that improves the safety of the vehicle.

Another object of the disclosure is to provide a bed illumination and tailgate lock system that provides improved bed illumination.

Yet another object of the disclosure is to provide a bed illumination and tailgate lock system that provides improved tailgate security.

Another object of the disclosure is to provide a bed illumination and tailgate lock system that prevents the tailgate from being stolen or vandalized.

Yet another object of the disclosure is to provide a bed illumination and tailgate lock system that works intuitively.

Another object of the disclosure is to provide a bed illumination and tailgate lock system that can be controlled remotely.

Yet another object of the disclosure is to provide a bed illumination and tailgate lock system that facilitates manual control of illumination.

Another object of the disclosure is to provide a bed illumination and tailgate lock system that provides accessory power in the bed.

Yet another object of the disclosure is to provide a bed illumination and tailgate lock system that can be connected to a conventional vehicle trailer wiring harness.

Another object of the disclosure is to provide a bed illumination and tailgate lock system that can be connected to practically any vehicle's electrical system.

Yet another object of the disclosure is to provide a bed illumination and tailgate lock system that that provides multi-purpose functionality.

Another object of the disclosure is to provide a bed illumination and tailgate lock system that solves bed illumination and tailgate locking problems in one system.

Yet another object of the disclosure is to provide a bed illumination and tailgate lock system that improves safety.

Another object of the disclosure is to provide a bed illumination and tailgate lock system that has a long useful life.

Yet another object of the disclosure is to provide a bed illumination and tailgate lock system that is durable.

Another object of the disclosure is to provide a bed illumination and tailgate lock system that is rugged.

Yet another object of the disclosure is to provide a bed illumination and tailgate lock system that can withstand the elements.

Another object of the disclosure is to provide a bed illumination and tailgate lock system that provides value, utility and novelty to the user.

These and other objects, features, or advantages of the invention will become apparent from the specification, claims and drawings.

SUMMARY OF THE INVENTION

A bed illumination and tailgate lock system is presented that includes a bed light and tailgate lock controller connected to a bed light system and a tailgate lock system. The bed light and tailgate lock controller is electrically connected to the wiring system of a vehicle and receives control signals, in the form of power being sent to the brake lights, and in response to receiving these control signals bed light and tailgate lock controller locks and unlocks the tailgate and illuminates the bed of the vehicle.

DETAILED DESCRIPTION OF THE PREFERRED EMBODIMENT

Figure 1:
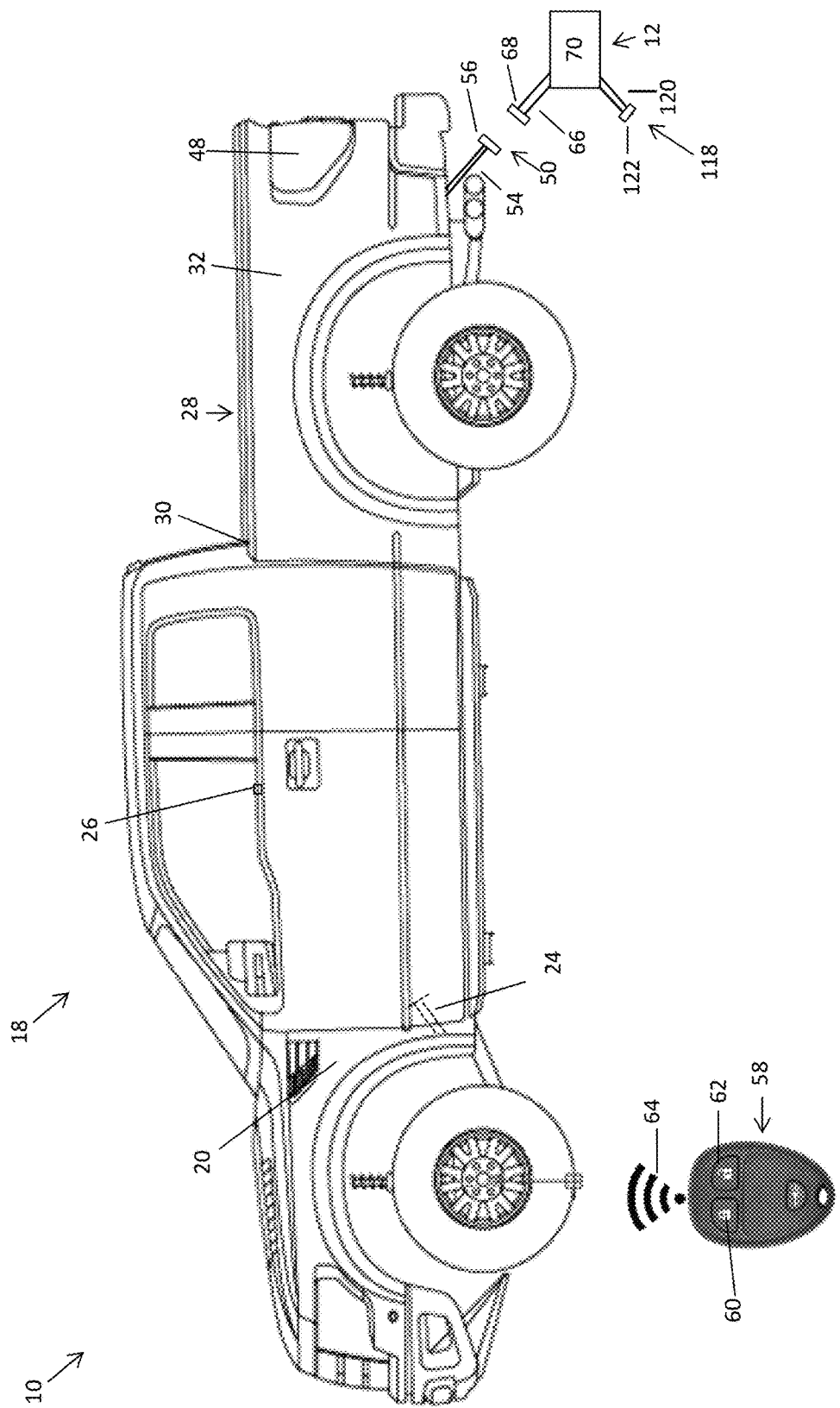
FIG. 1 is a side elevation view of a vehicle used in association with a bed illumination and tailgate lock system, the view showing the vehicle being in the form of a conventional pickup truck, the view showing the vehicle having a vehicle trailer wiring harness positioned at the rear of the vehicle below the tailgate, the view showing a bed light and tailgate lock controller that is configured to electrically connect to the vehicle trailer wiring harness and/or the vehicle wiring system, the view showing a wireless control configured to wirelessly transmit control signals that control the locking and unlocking of the vehicle which are used to control the illumination of the bed using a bed light system as well as locking the tailgate using a tailgate lock mechanism and the lowering of the tailgate using a tailgate pull handle actuator.
Figure 2:
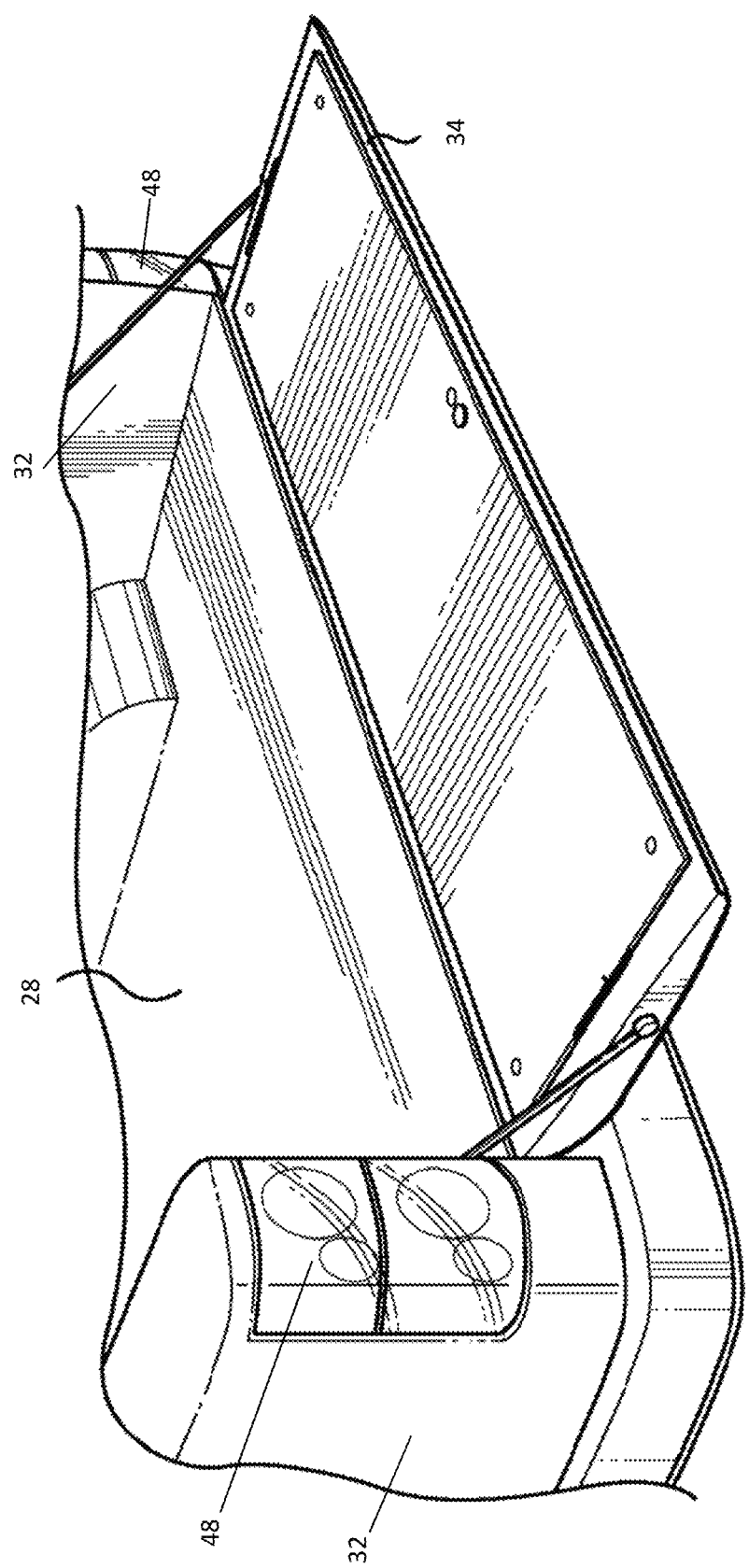
FIG. 2 is perspective view of the rear end of the bed of the vehicle, the view showing the tailgate in a lowered position.
Figure 3:
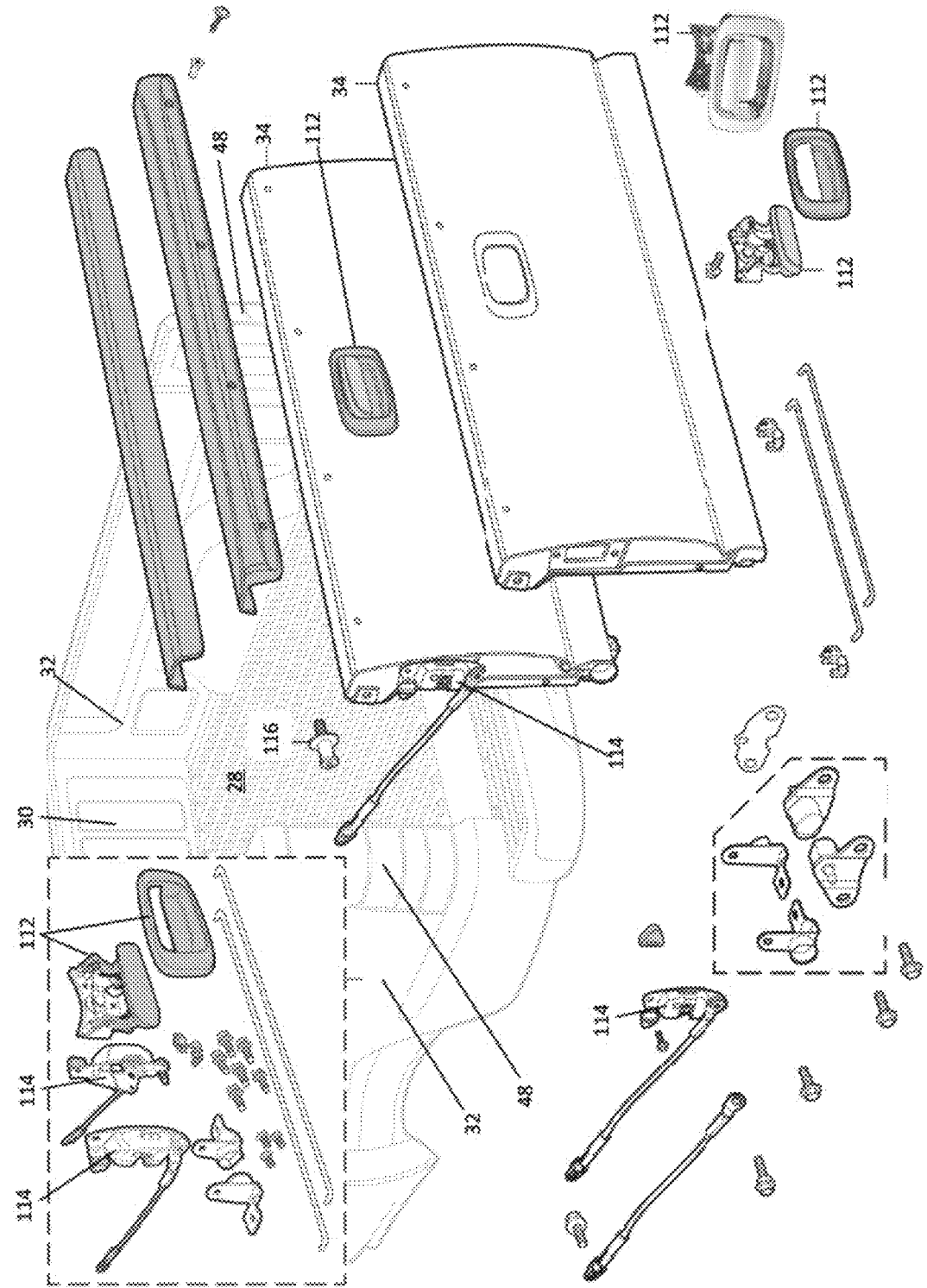
FIG. 3 is an exploded perspective view of the rear end of the bed of the vehicle, the view showing the bed having a forward wall, fenders and a tailgate, the view showing the handle, socket and post associated with the tailgate that facilitates lowering of the tailgate.
Figure 4:
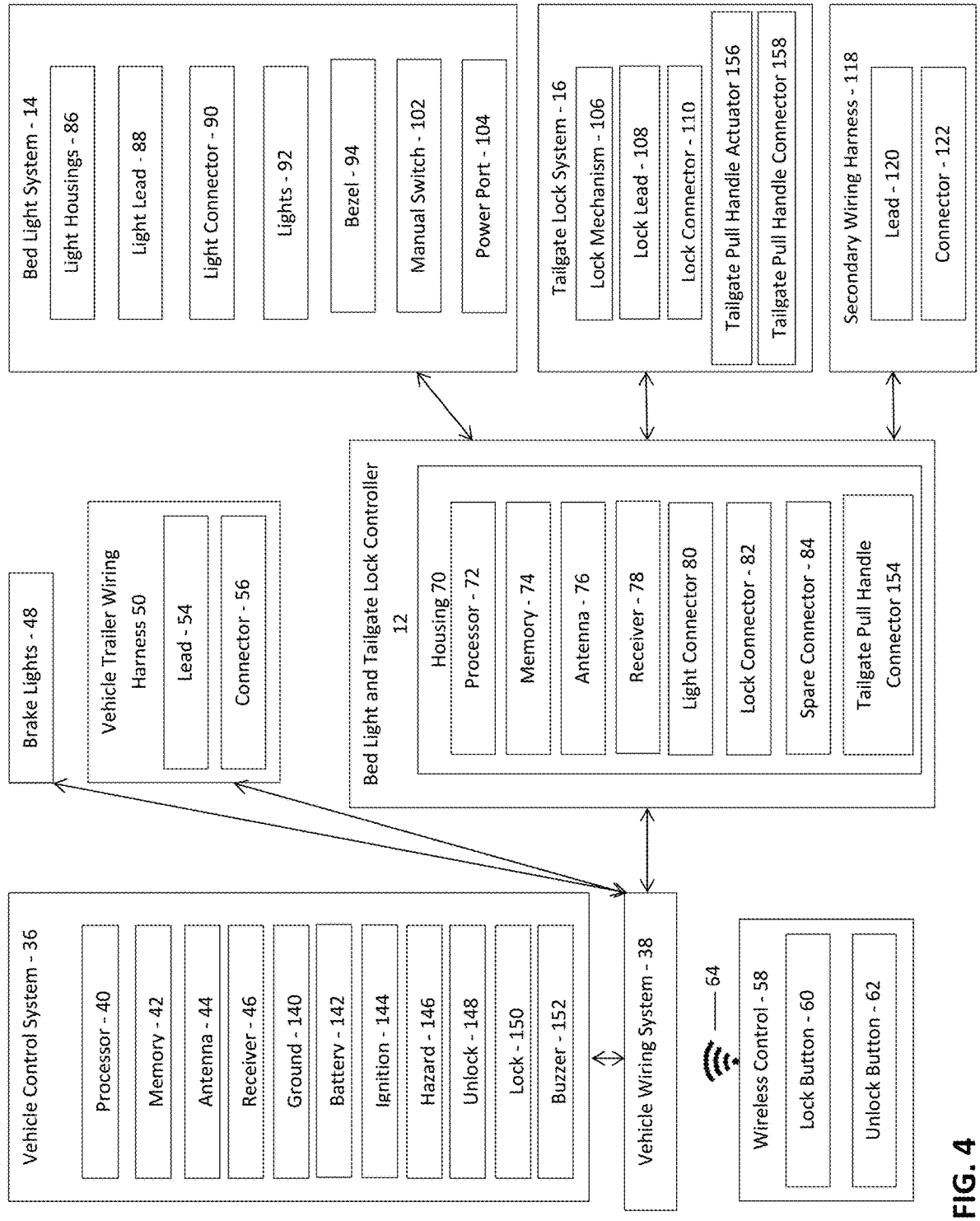
FIG. 4 is a plan view of an outline of the components of the bed light and tailgate lock system, the view showing a vehicle control system having a processor, memory, antenna, receiver, ground, battery, ignition, hazard, unlock, lock and buzzer, the view showing the vehicle control system connected to a vehicle wiring system 38, the view showing the vehicle having brake lights and a vehicle trailer wiring harness, the view showing a wireless control having a lock button and an unlock button wirelessly connected to the vehicle control system, the view showing a bed light and tailgate lock controller having a housing, a processor, memory, and antenna, a receiver, a light connector, a lock connector, a spare connector, a tailgate pull handle connector, the view showing a bed light system connected to the bed light and tailgate lock controller, the bed light system having light housings, a light lead, a light connector, lights, a bezel, a manual switch and a power port, the view showing a tailgate lock system connected to the bed light and tailgate lock connector the tailgate lock system having a lock mechanism, a lock lead, a lock connector, a tailgate pull handle actuator and a tailgate pull handle connector, the view showing a secondary wiring harness connected to the bed light and tailgate lock controller the secondary wiring harness having a lead and a connector.
Figure 5:
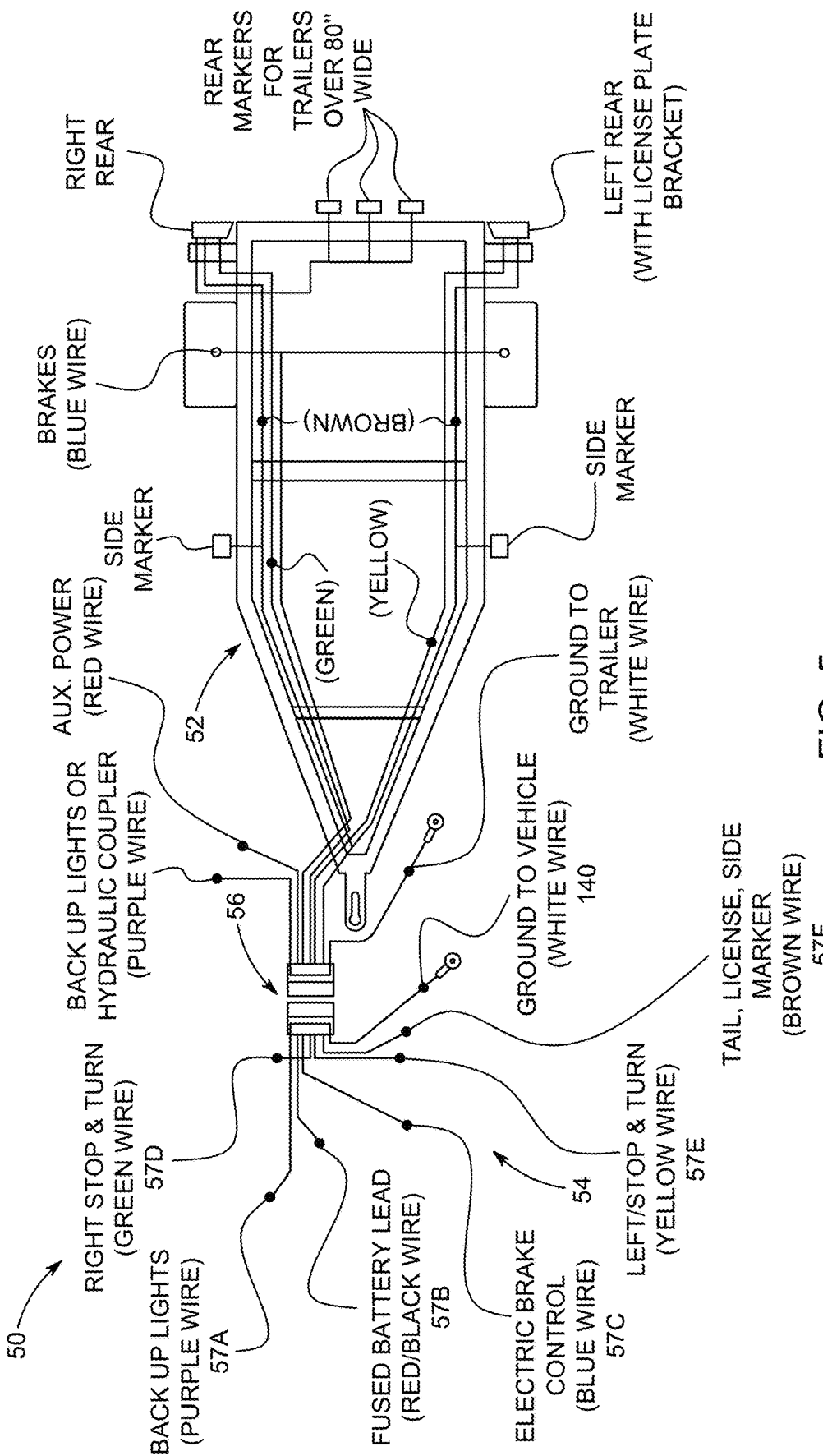
FIG. 5 is an elevation view of a vehicle trailer having a demonstrative layout of the leads of a vehicle trailer wiring harness, the view showing the components that each lead controls.
Figure 6:
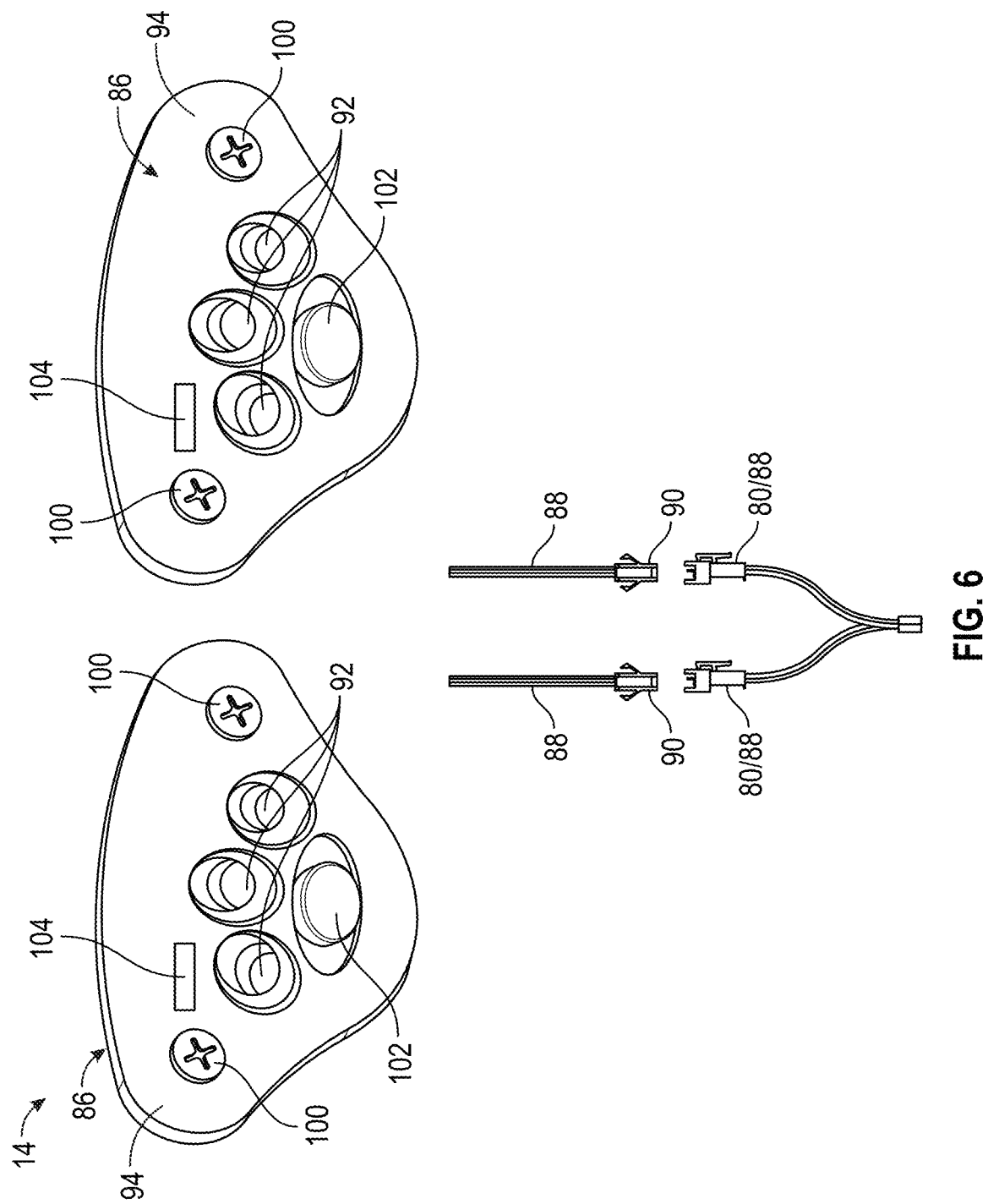
FIG. 6 is an elevation view of a demonstrative bed light system, the view showing a pair of light housings having lights, a manual switch and power port positioned in a bezel, the view showing the individual bezels connected by a light lead to a light connector that electrically connects the bed light system to the bed light and tailgate lock controller.
Figure 7:
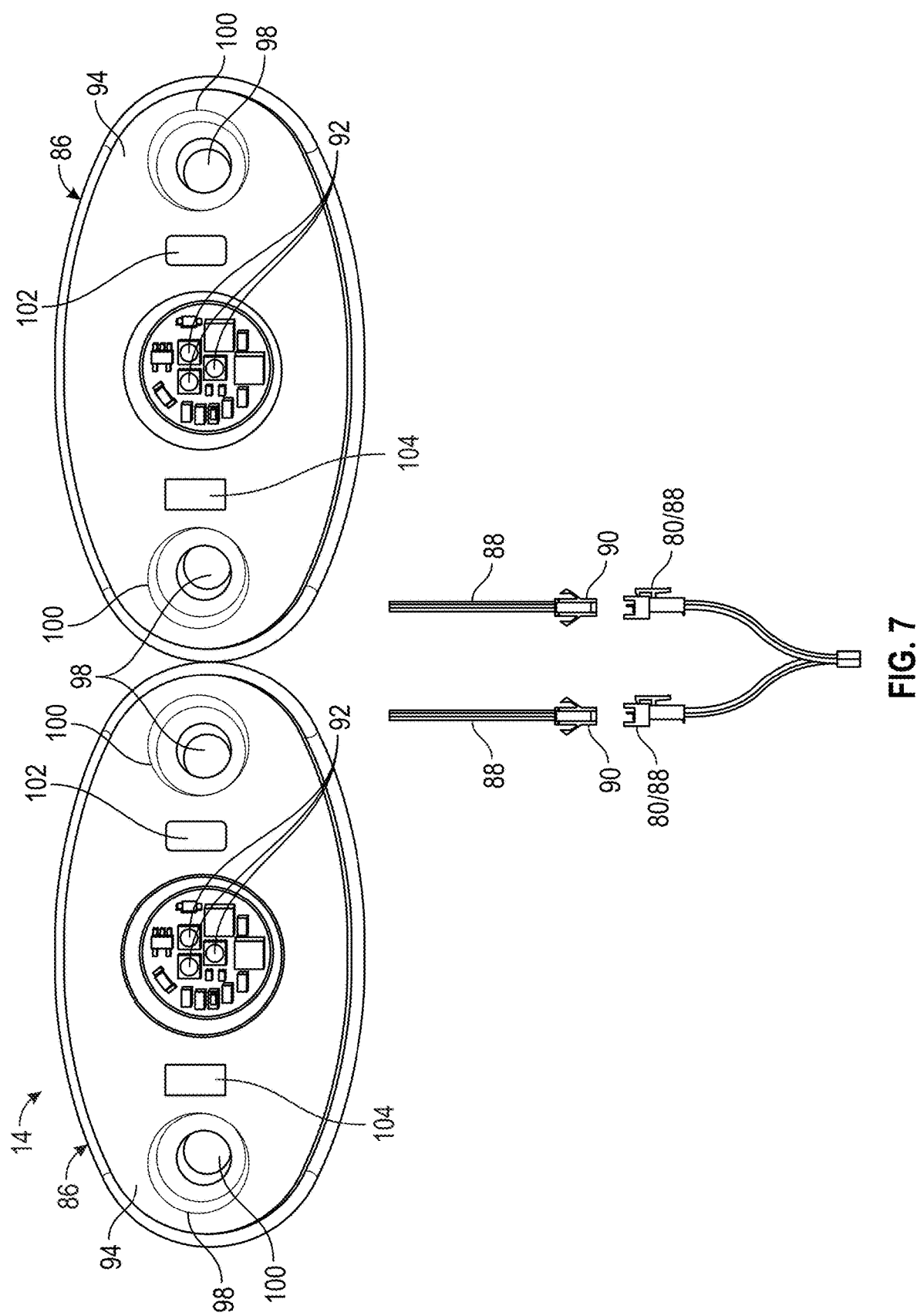
FIG. 7 is an elevation view of another demonstrative bed light system, the view showing a pair of light housings having lights, a manual switch and power port positioned in a bezel, the view showing the individual bezels connected by a light lead to a light connector that electrically connects the bed light system to the bed light and tailgate lock controller.
Figure 8:
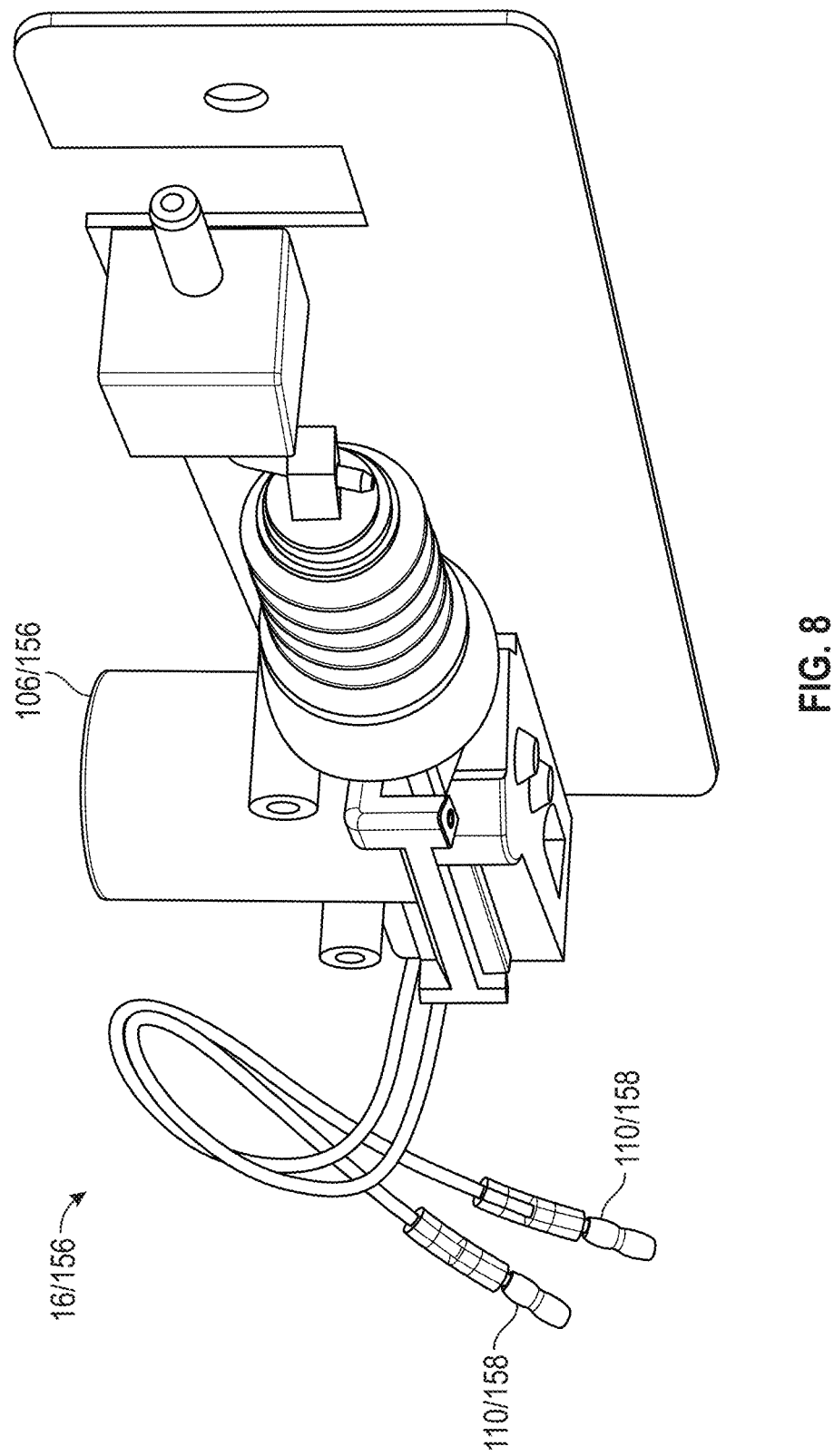
FIG. 8 is a perspective view of an example of a lock mechanism of the tailgate lock system as well as an example of a tailgate pull handle actuator.
Figure 9:
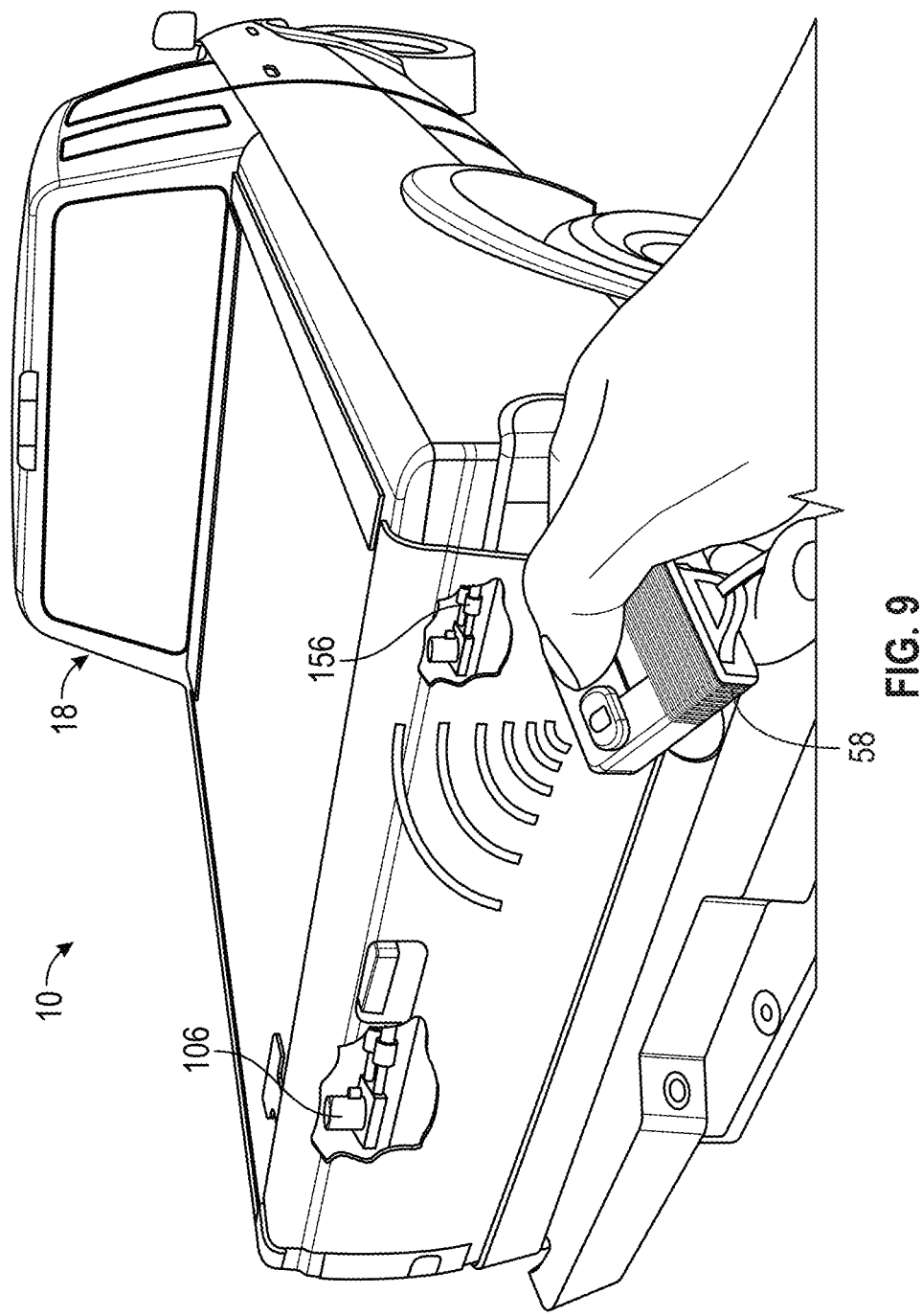
FIG. 9 is a perspective demonstrative cut-away view showing a lock mechanism and a tailgate pull handle actuator positioned within the tailgate of a vehicle, the view also showing a wireless control wirelessly connected to the vehicle and configured to control the illumination of the bed and the locking and lowering of the tailgate.
Figure 10:
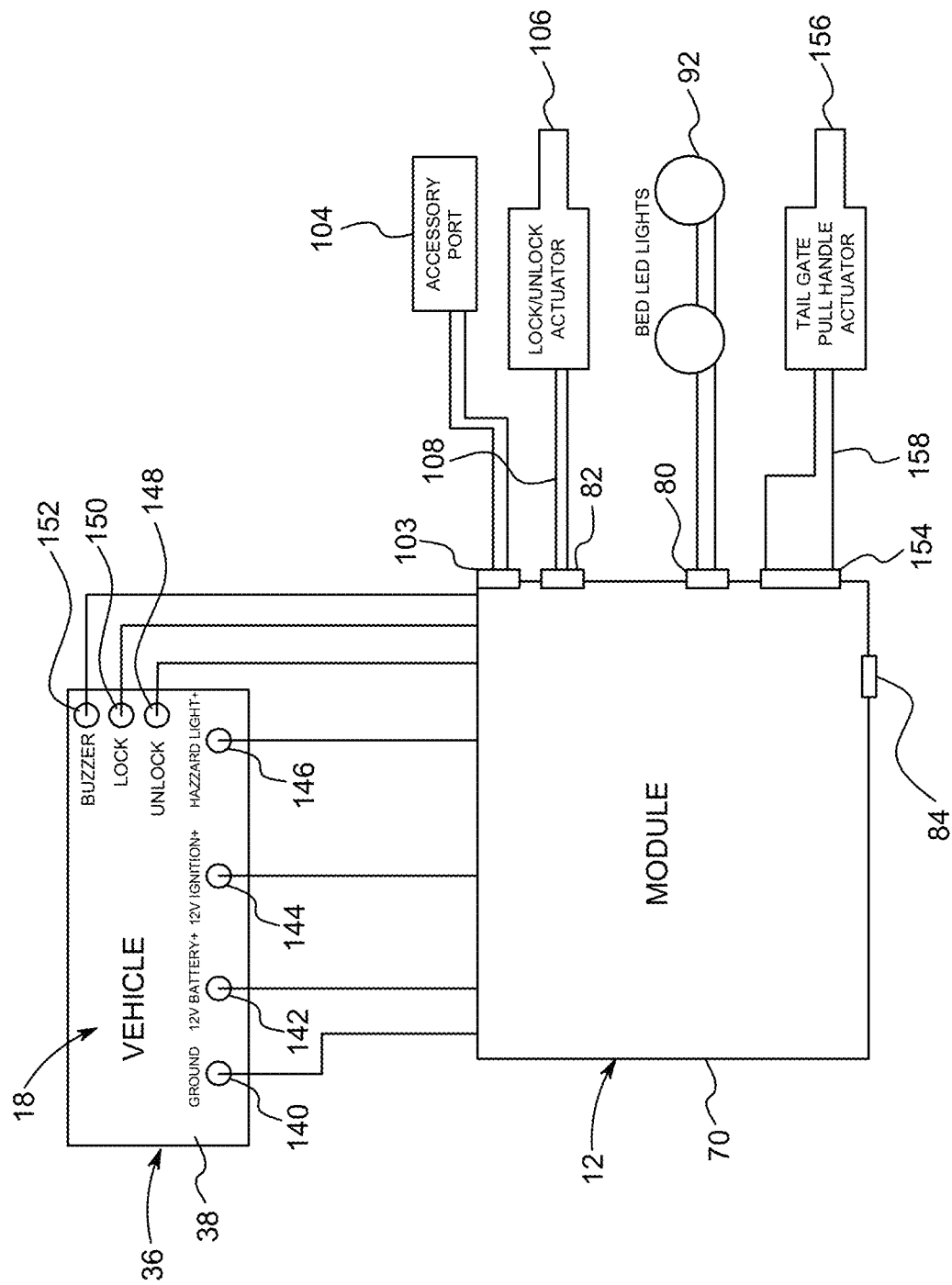
FIG. 10 is a plan view of a demonstrative manner of directly electrically connecting the bed light and tailgate lock controller to various components of the vehicle wiring system of the vehicle control system including direct connections to ground, battery, ignition, hazard, unlock, lock and buzzer, the view also shows the bed light and tailgate lock controller electrically connected to a power port, a lock mechanism, bed lights, a tailgate pull handle actuator and spare connectors, among other components in one manner of operation.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

Also, while the system shown herein is shown in use with a conventional vehicle, or more specifically a conventional pickup truck, this is only by way of example. It is to be understood that the system presented herein may be used with any configuration of a vehicle without limitation, including work trucks, panel trucks, utility vehicles, and the like. The system presented herein may also be used in systems or applications that do not include a vehicle.

System:

With reference to the figures, bed illumination and tailgate lock system 10 is presented (system 10). The system 10 includes the component pieces of a bed light and tailgate lock controller 12, a bed light system 14 and a tailgate lock system 16. The bed illumination and tailgate lock system 10 is shown, as one example, as being used with a vehicle 18.

Vehicle:

Vehicle 18 is formed of any suitable size, shape and design. In one arrangement, as is shown, vehicle 18 is what is known as a pickup truck. In the arrangement shown, as one example, vehicle 18 includes a main body 20, having a cab 22 that houses user controls such as a steering wheel, gas pedal, brake pedal 24, door locks 26, window controls, and other components. Vehicle 18 also includes a bed 28 that is enclosed by a forward wall 30 at its forward end, opposing fenders 32 positioned at its side, and a tailgate 34 positioned at its rearward end. Vehicle 18 also includes a vehicle control system 36 and a vehicle wiring system 38.

Vehicle control system 36 is formed of any suitable size, shape and design and is configured to communicate with and/or control the electronic components of vehicle 18. In one arrangement, as is shown, vehicle control system 36 includes a processor 40 and memory 42. Processor 40, which may be a microprocessor, or a plurality of microprocessors, is any computing device which receives information or signals, interprets these signals, and outputs information or commands based on instructions stored in memory 42. Memory 42 is any form of an informational storage device or system, such as RAM, flash memory, a hard drive, or the like that facilitates reception of, storage of and retrieval of information or data. This data or information often takes the form of software, code, firmware or the like stored on memory 42 which is accessible to processor 40. Processor 40 and/or memory 42 may be formed of a single unitary device, separate but electrically connected devices, or a plurality of separate but electrically connected devices, or any combination thereof.

In one arrangement, an antenna 44 and receiver 46 of vehicle control system 36 and are electrically connected to processor 40 and memory 42. Antenna 44 is any device which receives and/or transmits over-the-air wireless signals such as radio waves. Antenna 44 is electrically connected to receiver 46. Antenna 44 is configured to transmit the signals it receives to receiver 46 and receiver 46 is configured to interpret these signals and transmit the interpreted signals to processor 40 for further interpretation and action by processor 40 according to the instructions or software stored in memory 42. Processor 40 outputs control signals through vehicle wiring system 38 that control operation of the electrical components of vehicle 18 such as brake lights 48.

Vehicle wiring system 38 is formed of any suitable size, shape and design and is configured to electrically connect and interconnect the electrical components of vehicle 18. In one arrangement, vehicle wiring system 38 is a network of wires and other electrical components that extend through and throughout vehicle 18. Vehicle wiring system 38 carries power, ground and control signals throughout vehicle 18.

In one arrangement, vehicle wiring system 38 includes or is connected to a vehicle trailer wiring harness 50. Vehicle trailer wiring harness 50 is formed of any suitable size, shape and design and is configured to quickly and easily electrically connect and electrically disconnect the electrical system of a trailer 52 to the vehicle wiring system 38 of vehicle 18. Vehicle trailer wiring harness 50 facilitates the transmission of power and control signals to the electrical components of trailer 52. In one arrangement, as is shown, vehicle trailer wiring harness 50 is positioned at or near the rear of vehicle 18 and includes an electrical lead 54 that terminates at a connector 56. Many forms of vehicle trailer wiring harnesses are presently available, all of which are hereby contemplated for use in system 10. Common examples are known as two-way, three-way, four-way, five-way, six-way and seven-way systems with a plurality of configurations of connectors 56 including flat, round and blade connectors, all of which are hereby contemplated for use as well as any other configuration of a connector 56.

In one arrangement, vehicle trailer wiring harness 50 includes: a backup light lead 57A (which is often purple in color) which provides power to back up lights of trailer 52; a fused battery lead, or auxiliary power lead 57B (which is often red or red/black) which provides auxiliary power to trailer 52; an electric brake control lead 57C (which is often blue) which provides power to electric brakes of trailer 52; a right stop and turn signal lead 57D (which is often green) which provides power to the right (or passenger side) brake light and turn signal of trailer 52; a left stop and turn signal lead 57E (which is often yellow) which provides power to the left (or driver side) brake light and turn signal of trailer 52; a tail, license and side marker lead 57F (which is often brown) which provides power to tail, license and side marker lights of trailer 52; and a ground to vehicle lead 57G (which is often white) which provides a line to ground of the vehicle 18.

In one arrangement, as one example, when the brake pedal 24 is depressed, a control signal is transmitted through the vehicle wiring system 38 to brake lights 48 thereby causing brake lights 48 to illuminate. In this example, the control signal to brake lights 48 takes the form of electrical power transmitted to the brake lights 48 through the vehicle wiring system 38. Simultaneously with the control signal being transmitted through the vehicle wiring system 38 to brake lights 48, a control signal is transmitted through the vehicle trailer wiring harness 50.

In one arrangement, processor 72 of bed light and tailgate lock controller 12 includes an algorithm that helps interpret control signals received through vehicle wiring system 38 to determine the appropriate control signal output. In one arrangement, the algorithm helps bed light and tailgate lock controller 12 determine whether an illumination of a brake light is a brake light control signal or a turn signal. Part of the complexity is in that the turn signal line and the brake light line are one and the same in many vehicles 18, vehicle wiring system 38 and/or vehicle trailer wiring harnesses 50 and what separates a brake light control signal from a turn light control signal is that a brake light control signal is a simultaneous or near simultaneous illumination of both brake lights 48 (right stop turn signal lead 57D and left stop and turn signal lead 57E) whereas a turn light control signal is an independent illumination of one of the brake lights 48 (right stop turn signal lead 57D or left stop and turn signal lead 57E). This algorithm is also used to interpret the duration of the illuminated states so as to determine whether illumination of brake lights 48 is a lock or unlock signal due to locking or unlocking vehicle 18 using wireless control 58. The algorithm is used to more-precisely control operation of the system 10 and prevent unintended operation.

In one arrangement, a wireless control 58 is associated with vehicle 18. Wireless control 58 is formed of any suitable size, shape and design and is configured to transmit wireless signals to vehicle 18 thereby remotely controlling functionality of vehicle 18. In one arrangement, as is shown, wireless control 58 includes a lock button 60 and an unlock button 62, among other buttons. When the lock button 60 or unlock button 62 is depressed within over-the-air communication distance with vehicle 18 a wireless signal 64 is transmitted which is received by antenna 44 and transmitted to receiver 46 and processor 40. In response to receiving this wireless signal 64, processor 40 transmits control signals through vehicle wiring system 38.

As one example, in the arrangement where lock button 60 is depressed, vehicle control system 36 transmits a control signal causing the powered door locks 26 of vehicle 18 to lock. To provide a visual indication of the reception of this lock control signal, many configurations of vehicle 18 are configured to flash the headlights and/or brake lights 48 (once, or twice or three times or the like). In some configurations, an audible indication is also transmitted, such as one or two beeps of a horn.

As one example, in the arrangement where lock button 60 is depressed twice (within rapid succession or a predetermined amount of time), vehicle control system 36 transmits a first control signal causing the powered door locks 26 of vehicle 18 to lock in response to the first press. To provide a visual indication of the reception of this lock control signal, many configurations of vehicle 18 are configured to flash the headlights and/or brake lights 48 (once, or twice or three times or the like). In response to the second press, the vehicle control system 36 transmits a second control signal again causing the powered door locks 26 of vehicle 18 and to provide a visual indication of the reception of this second lock control signal, many configurations of vehicle 18 are configured to flash the headlights and/or brake lights 48 a second time (or twice, or three times or the like. In addition, in response to the second press, the vehicle control system 36 transmits a signal through buzzer 152, or buzzer line, to a horn or other audible indicator which results in an audible indication such as a beep or a buzz that indicates the vehicle 18 has been locked. In this arrangement, the first press of the lock button 60 is silent whereas upon the second press the audible indication is provided through buzzer 152 thereby indicating the vehicle 18 has been locked.

As another example, in the arrangement where unlock button 62 is depressed, vehicle control system 36 transmits a control signal causing the powered door locks of vehicle 18 to unlock. To provide a visual indication of the reception of this unlock control signal, many configurations of vehicle 18 are configured to flash the headlights and brake lights 48 (once, or twice or three times or the like).

As another example, in the arrangement where unlock button 62 is depressed twice (within rapid succession or a predetermined amount of time), upon a first press, vehicle control system 36 transmits a first control signal causing the powered door lock of the driver's door of vehicle 18 to unlock. To provide a visual indication of the reception of this unlock control signal, many configurations of vehicle 18 are configured to flash the headlights and/or brake lights 48 (once, or twice or three times or the like). Where unlock button 62 is depressed a second time, vehicle control system 36 transmits a second control signal causing the powered door lock of the passenger's door, all the other doors, or all doors of vehicle 18 to unlock. To provide a visual indication of the reception of this unlock control signal, many configurations of vehicle 18 are configured to flash the headlights and/or brake lights 48 (once, or twice or three times or the like).

Bed Light and Tailgate Lock Controller:

Bed light and tailgate lock controller 12 is formed of any suitable size, shape and design and is configured to connect to the vehicle wiring system 38 and connect to and control bed light system 14 as well as tailgate lock system 16. In one arrangement, as is shown, bed light and tailgate lock controller 12 includes a lead 66 and a connector 68. Connector 68 of bed light and tailgate lock controller 12 is configured to connect to the connector 56 of vehicle trailer wiring harness 50 in a mating arrangement. In this arrangement, one of the connectors 56/68 is a male connector and the other of the connectors 56/68 is a female connector. In an alternative arrangement, connector 68, which may be formed of a single component or a plurality of parts or components, is configured to tap into electrical components of the vehicle wiring system 38 and/or vehicle control system 36, such as the fuse box, electrical wires, or the like. Lead 66 electrically connects connector 68 to the other electrical components of bed light and tailgate lock controller 12. In the arrangement shown, as one example, lead 66 of bed light and tailgate lock controller 12 connects to housing 70 on an end opposite connector 68.

Housing 70 is formed of any suitable size, shape and design and is configured to house and hold some or all of the electrical components of bed light and tailgate lock controller 12. In one arrangement, as is shown, bed light and tailgate lock controller 12 includes a processor 72 and memory 74. Processor 72, which may be a microprocessor, or a plurality of microprocessors is any computing device which receives information or signals, interprets these signals, and outputs information or commands based on instructions stored in memory 74. Memory 74 is any form of an informational storage device or system, such as RAM, flash memory, a hard drive, or the like that facilitates reception of, storage of, and retrieval of information or data. This data or information often takes the form of software, code, firmware or the like stored on memory 74 which is accessible to processor 72. Processor 72 and/or memory 74 may be formed of a single unitary device, separate but electrically connected devices, or a plurality of separate but electrically connected devices, or any combination thereof.

In one arrangement, bed light and tailgate lock controller 12 also includes an antenna 76 and receiver 78 that are electrically connected to processor 72 and memory 74. Antenna 76 is any device which receives and/or transmits over-the-air wireless signals such as radio waves. Antenna 76 is electrically connected to receiver 78. Antenna 76 is configured to transmit the signals it receives to receiver 78 and receiver 78 is configured to interpret these signals and transmit the interpreted signals to processor 72 for further interpretation and action by processor 72 according to the instructions or software stored in memory 74. Processor 72 outputs control signals that control operation of the bed light system 14 and tailgate lock system 14.

The inclusion of antenna 76 and receiver 78 facilitates the independent wireless control of bed light and tailgate lock controller 12 through a wireless control 58 which transmits control signals directly to bed light and tailgate lock controller 12. In contrast, when bed light and tailgate lock controller 12 does not include an antenna 76 and receiver 78, bed light and tailgate lock controller 12 is controlled through control signals received through vehicle wiring system 38. When bed light and tailgate lock controller 12 does include an antenna 76 and receiver 78, bed light and tailgate lock controller 12 may be controlled by both control signals received through vehicle wiring system 38 as well as by wireless control signals received directly to antenna 76 and receiver 78.

Bed light and tailgate lock controller 12 electrically connects to bed light system 14 and tailgate lock system 16. In one arrangement, bed light and tailgate lock controller 12 includes a light connector 80 and a lock connector 82. Light connector 80 facilitates electrical connection to light system 14 and lock connector 82 facilitates electrical connection to lock system 16. Light connector 80 and a lock connector 82 may be formed of any form of a socket or plug that mates with a corresponding connector of the light system 14 and lock system 16, respectively. The inclusion of light connector 80 and a lock connector 82 facilitates quick and easy and reliable connection of the bed light system 14 and tailgate lock system 16 to the bed light and tailgate lock controller 12 which speeds and eases installation. The inclusion of light connector 80 and a lock connector 82 also facilitates quick and easy disconnection of the bed light system 14 and tailgate lock system 16 from the bed light and tailgate lock controller 12 which speeds and eases installation. In an alternative arrangement, bed light system 14 and tailgate lock system 16 are directly wired to bed light and tailgate lock controller 12 and are non-removable from bed light and tailgate lock controller 12.

In one arrangement, bed light and tailgate lock controller 12 includes one or more spare connectors 84 in or associated with housing 70. Spare connectors 84 facilitate connection of auxiliary devices to bed light and tailgate lock controller 12 in the same way that bed light system 14 connects to light connector 80 and tailgate lock system 16 connects to lock connector 82. Spare connectors 84 provide power and control signals to additional devices in the convenient location of housing 70 (which is at the rear of vehicle 18).

In one arrangement, bed light and tailgate lock controller 12 also includes a power port connector 103. Power port connector 103 facilitates electrical connection to and control of accessory port 104. Power port connector 103 may be formed of any form of a socket or plug or connection that mates with a corresponding connector of power port 104 that facilitates the quick and easy and durable electrical connection to and control of power port 104.

In one arrangement, bed light and tailgate lock controller 12 also includes a tailgate pull handle connector 154. Tailgate pull handle connector 154 facilitates electrical connection to and control of tailgate pull handle actuator 156. Tailgate pull handle connector 154 may be formed of any form of a socket or plug or connection that mates with a corresponding connector of tailgate pull handle actuator 156 that facilitates the quick and easy and durable electrical connection to and control of tailgate pull handle actuator 156.

Bed Light System:

Bed light system 14 is formed of any suitable size, shape and design and is configured to electrically connect to the bed light and tailgate lock controller 12 and provide illumination to the bed 28 of vehicle 18. Bed light system 14 also provides manual control of the illumination as well as automated control of the illumination. In one arrangement, as is shown, bed light system 14 includes one or more light housings 86 that are electrically connected to a light lead 88 that terminates at a light connector 90.

Light housing 86 is formed of any suitable size, shape and design and is configured to house and old one or more lights 92 therein. Lights 92 are any form of an illuminating device such as a light bulb, a light emitting diode (LED), a compact florescent light (CFL), an incandescent bulb, a halogen bulb, a high-intensity discharge bulb (HID) or the like or any combination thereof. Light housing 86 is also configured to facilitate installation into to bed 28.

In the arrangement shown, as one example, light housing 86 includes a bezel 94 that is formed of a generally flat plate that includes a pair openings 98, one opening 98 positioned at each opposing sides of bezel 94, that are configured to receive fasteners 100 therein. Bezel 94 is configured to be installed onto bed 28 by placing bezel 94 against the bed 28 and passing fasteners 100 through openings 98 and into bed 28 thereby connecting light housing 86 to the bed 28 of vehicle 18. In an alternative arrangement, light housings 86 may be installed by any other manner, method or means of installation including by adhesively attaching light housings 86 to bed 28, snap fitting light housings 86 in place, or any other manner or method of installation. In another arrangement, light housing 86 may be in the form of an elongated strip or elongated housing that is installed along a length of the bed 28 of vehicle 18, such as under the lip at the upper end of the bed 28. In another arrangement, light housing 86 may be in the form of a rope or other flexible member that may be snaked along a length of the bed 28 of vehicle 18, such as under the lip at the upper end of the bed 28.

In the arrangement shown, as one example, light housing 86 includes a plurality of lights 92 therein. Having a plurality of lights 92 associated with each light housing 86 increases the amount of illumination provided by each light housing 86 as well as allows light to be directed in different areas from each light housing 86, thereby increasing the area that direct illumination is cast upon. Any number of lights 92 is hereby contemplated for use with each light housing 86.

Also, in the arrangement shown, as one example, light housing 86 includes one or manual switches 102. In the arrangement shown, a single manual switch 102 takes the form of a depressible button that is positioned just below lights 92. In the arrangement shown, manual switch 102 is used to turn on or turn off illumination of lights 92. In other arrangements, manual switch 102 may be used to lock or unlock tailgate lock system 16, or provide any other functionality.

Also, in other arrangements additional manual switches 102 are provided with each manual switch 102 providing its own functionality. As one example, when two manual switches 102 are presented, a first switch may be used to control illumination of lights 92 and a second switch may be used to control operation of tailgate lock system 16. When a third switch is present, the third switch may control operation of tailgate pull handle actuator 156.

In the arrangement wherein a plurality of light housings 86 are installed into bed 28, in one arrangement all light housings 86 include a manual switch 102 and either each light housing 86 is controlled independently or all light housings 102 are controlled simultaneously with any manual switch 102. In another arrangement, wherein a plurality of light housings 86 are installed into bed 28, in one arrangement only a single light housings 86 includes a manual switch 102 which controls all light housings. In this arrangement, the light housing 86 having the manual switch 102 may be placed near the rear of the bed 28 to facilitate easy access to switch 102, however any other location is hereby contemplated for use.

In one arrangement, manual switch 102 may be a dual function switch or a multi-function switch. That is, the single manual switch 102 may be used to perform several operations. As one example, when manual switch 102 is depressed for less than a predetermined amount of time a first function is performed, such as turning on/off the lights 92; and when manual switch 102 is depressed for more than a predetermined amount of time a second function is performed, such as locking or unlocking tailgate lock system 16; and when manual switch 102 is depressed for more than a second predetermined amount to time a third function is performed, such as activating the tailgate pull handle actuator 156. Instead of pressing switch 102 for an amount of time, any other differentiating factor may be used to select different functionalities such as a multi-position switch, wherein each position correlates to a different function, or a pressure sensitive switch wherein the amount of force applied correlates to a different function, or any other arrangement is hereby contemplated for use.

Adding the dual or triple functionality to manual switch 102 provides convenience as a single manual switch 102 can be used to control both the bed light system 14 and tailgate lock system 16 and/or tailgate pull handle actuator 156 from one convenient location within the bed 28. In addition, this facilitates unlocking and/or lowering the tailgate lock system 16 without the need for wireless control 58, which is helpful when wireless control 58 is lost or not present. In addition, by setting the predetermined amount of time at a relatively long, if not excessive, amount of time (such as one, two, three, four, five, six, seven, eight, nine or ten seconds or more) this provides the convenience of unlocking the tailgate 34 from the bed 28 while not substantially compromising the security of the tailgate 34 as it would not be known or intuitive to depress the manual switch 102 for such an elongated period of time to unlock the tailgate 34.

In one arrangement, one or more light housings 86 include one or more power ports 104. Power port 104 is formed of any suitable size, shape and design and is configured to quickly and easily connect to other electrical components and provide power thereto. Power port 104 may be formed of any form of a socket or plug that mates with a corresponding connector, including a USB port—type A, a USB port—type B, a USB port—type C, a USB port 2.0, a USB port 3.0, a USB port 3.1 Gen 1, a USB port 3.1 Gen 2, a micro-USB port, a mini USB port, a thunderbolt port, a 3.5 mm audio jack, an Ethernet jack, an HDMI jack, a display port or mini display port, a DVI port, an SD port or microSD port, or any other form of a port or connector. The inclusion of power port 104 facilitates quick and easy and reliable connection to the bed light system 14 and provides convenient power to auxiliary devices in the bed 28 of vehicle 18. This allows a user to run electrical components in the bed 28 of the vehicle 18 in an easy and convenient manner.

Also, in the arrangement wherein vehicle 18 includes its own connection to the internet, power port 104 provides direct wired connection to the internet connection of vehicle 18.

The inclusion of power port 104 in bed light system 14 provides a great amount of convenience as users can charge their phone, laptop or other battery powered device from the bed 28 of vehicle 18. In addition, users can plug in devices that require power such as speakers, stereos, laptops, crock pots, lights, fans, or any other electronic device that requires power to run or power to recharge conveniently in the bed 28 of the vehicle 18.

In the arrangement shown, power port 104 is positioned on or in one or all of the bezels 94 of bed light system 14. In an alternative arrangement, power port 104 is located separately from bezels 94 of bed light system 14. In this arrangement, as one example, power port 104 extends through an opening in bed 28 of vehicle 18, or at any other location of vehicle 18.

In one arrangement, a single light housing 86 is positioned on each side of bed 18. In another arrangement, a plurality of light housings 86 are positioned on each side of bed 18. In one arrangement, each light housing 86 includes its own light lead 88 and light connector 90 that connects to a light connector 80 of housing 70 of bed light and tailgate lock controller 12. This is known as a star network. In another arrangement, when one light housing 86 is positioned on each side of the bed 28 of vehicle 18, a single light lead 88 having a single connector 90 branches out to each side of the bed 28. In yet another arrangement, when a plurality of light housings 86 are positioned on each side of the bed 28 of vehicle 18, a single light lead 88 having a single connector 90 branches out to each side of the bed 28 and connects to the first light housing 86 and from there connects to each of the following light housings 86. This arrangement is known as a daisy chain network. Any other manner of connecting one or more light housings 86 to a light connector 80 of housing 70 of bed light and tailgate lock controller 12.

Tailgate Lock System:

Tailgate lock system 16 is formed of any suitable size, shape and design and is configured to electrically connect to the bed light and tailgate lock controller 12 and to facilitate remote and automatic powered locking and unlocking of tailgate 34. In one arrangement, as is shown, tailgate lock system 16 includes a lock mechanism 106 (also known as a tailgate lock actuator) that is connected to a lock lead 108 and a lock connector 110.

Lock mechanism 106 is formed of any suitable size, shape and design and is configured lock and unlock tailgate 34 in response to control signals received from bed light and tailgate lock controller 12. Lock mechanism 106 is formed of any device that converts electrical power into motion such as an electro magnet, a solenoid, a motor, an actuator or the like systems. The term "actuator" as is used herein is intended to mean any electronic device that is configured to move or control a mechanical device.

Lock mechanism 106 is installed within tailgate 34 adjacent handle 112 and socket 114 of tailgate 34. When lock mechanism 106 is in a disengaged position, tailgate 34 is freely opened using handle 112. When lock mechanism 106 is in an engaged position, socket 114 is locked on post 116 and the tailgate 34 is prevented from being opened, and for that matter removed and stolen.

In one arrangement, lock leads 108 are electrically connected to bed light and tailgate lock controller by connecting lock connector 110 of lock lead 108 to the lock connector 82 of housing 70 of bed light and tailgate lock controller 12.

Backup Light Functionality:

In one arrangement, a signal that illuminates a backup light on backup light lead 57A is used to control the bed light system 14 and/or the tailgate lock system 16. In one arrangement, use of the backup light lead 57A to control the bed light system 14 and/or the tailgate lock system 16 is in addition to use of a brake light signal (on right stop and turn signal lead 57D and left stop and turn signal lead 57E). In another arrangement, use of the backup light lead 57A to control the bed light system 14 and/or the tailgate lock system 16 replaces use of a brake light signal (on right stop and turn signal lead 57D and left stop and turn signal lead 57E).

To move practically any vehicle 18 out of park, the driver must move past reverse. When the gear shift moves past reverse a signal (a control signal), even if brief, is transmitted through backup light lead 57A which illuminates the backup lights, even if for only a short period of time. In one arrangement, when this control signal is transmitted on back up light lead 57A this signal is received by bed light and tailgate lock controller 12. Bed light and tailgate lock controller 12 interprets this signal by processor 72 according to instructions stored in memory 74 and uses this control signal to lock the tailgate lock system 16 and/or terminate illumination of bed light system 14.

Installation:

The tailgate lock system 16 is installed by removing handle 112 from tailgate 34 and installing lock mechanism 106 within tailgate 34 such that lock mechanism 106 facilitates free opening of tailgate 34 when in a disengaged position and locks socket 114 of tailgate 34 on post 116 of the bed 28 when in an engaged position. Once the lock mechanism 106 is installed, the lock lead 108 and lock connector 110 are passed through the tailgate 34 and to the position where bed light and tailgate lock controller 12 is installed.

The bed light system 14 is installed by placing light housings 86 at the desired positions in bed 28 and installing them in place. In one arrangement, installation requires passing fasteners 100 through openings 98 in bezel 94 of light housing 86 and into the material of bed 28. In another arrangement, installation requires applying adhesive, such as a double sided tape or gel or glue or other adhesive to the connecting surfaces of bezel 94 or light housing 86 and the connecting surfaces of bed 28. Any other manner of holding or affixing light housings 86 in place is hereby contemplated for use, as is any combination thereof. Once light housings 86 are installed, the light lead 88 and light connector 90 are passed along or through bed 28 and to the position where bed light and tailgate lock controller 12 is installed.

The bed light and tailgate lock controller 12 is installed by placing bed light and tailgate lock controller 12 at any desired positions in, under or along bed 28 or any other position on vehicle 18. In one arrangement, bed light and tailgate lock controller 12 is installed within tailgate 34. In another arrangement, bed light and tailgate lock controller 12 is installed under bed 28. Any other position on, in, or under vehicle 18 is hereby contemplated for installation of bed light and tailgate lock controller 12. Once in the desired position, bed light and tailgate lock controller 12 is held or affixed in place by any manner, method or means such as by screwing, bolting, affixing, zip-tying, adhering or by attaching by any other manner, method or means. In one arrangement, installation requires passing fasteners 100 through an opening in bed light and tailgate lock controller 12 and into a portion of vehicle 18. In another arrangement, installation requires applying adhesive, such as a double sided tape or gel or glue or other adhesive to the connecting surfaces of bed light and tailgate lock controller and the connecting surfaces of vehicle 18. Once bed light and tailgate lock controller 12 is installed, bed light system 14 and tailgate lock system 16 are connected to the bed light and tailgate lock controller 12.

Bed light system 14 is installed by connecting the light connector 90 of light lead 88 with the light connector 80 of bed light and tailgate lock controller 12 thereby electrically connecting the two components together. In the arrangement, wherein the light connector 90 of light lead 88 of bed light system 14 is a plug and the light connector 80 of bed light and tailgate lock controller 12 is a socket, the plug of bed light system 14 is inserted into the socket of bed light and tailgate lock controller 12. In an alternative arrangement, the light lead 88 of bed light system 14 is directly wired to or hard-wired to bed light and tailgate lock controller 12.

Tailgate lock system 16 is installed by connecting the lock connector 110 of lock lead 108 with the lock connector 82 of bed light and tailgate lock controller 12 thereby electrically connecting the two components together. In the arrangement, wherein the lock connector 110 of lock lead 108 of tailgate lock system 16 is a plug and the lock connector 82 of bed light and tailgate lock controller 12 is a socket, the plug of tailgate lock system 16 is inserted into the socket of bed light and tailgate lock controller 12. In an alternative arrangement, the lock lead 108 of tailgate lock system 16 is directly wired to or hard-wired to bed light and tailgate lock controller 12.

Bed light and tailgate lock system controller 12 is electrically connected to vehicle wiring system 38 by connecting the connector 68 of lead 66 of bed light and tailgate lock controller 12 with the connector 56 of lead 54 of vehicle trailer wiring harness 50 of vehicle wiring system 38. In the arrangement, wherein one of the connector 68 of lead 66 of bed light and tailgate lock controller 12 and the connector 56 of lead 54 of vehicle trailer wiring harness 50 of vehicle wiring system 38 is a socket and the other is a plug, the plug is inserted into the socket thereby electrically connecting the two components together. In an alternative arrangement, the connector 68 of lead 66 of bed light and tailgate lock controller 12 is directly wired to or hard-wired to the vehicle wiring system.

In Operation:

Once the bed illumination and tailgate lock system 10 is installed onto vehicle 18 and the bed light and tailgate lock controller 12 is connected to the bed light system 14 and the tailgate lock system 16, the system 10 functions to automatically lock and unlock tailgate 34 using tailgate lock system 16 while also automatically illuminating bed 28 using bed light system 14. This is accomplished by the bed light and tailgate lock controller 12 receiving control signals through the electrical connection to vehicle wiring system 38. More specifically, bed light and tailgate lock controller 12 receives control signals when the brake lights 48 are illuminated by power being supplied to the right stop and turn signal lead 57D and left stop and turn signal lead 57E. Upon receiving these control signals, the processor 72 of bed light and tailgate lock controller 12 determines how to control the bed light system 14 and tailgate lock system 16 according to instructions stored in memory 74. Examples of how wireless control 58 is used to control locking of tailgate 34 and illumination of bed 28 follow:

Lock Function:

When the lock button 60 on wireless control 58 is pressed a single time, a wireless signal is transmitted over the air to antenna 44 of vehicle 18, which is transmitted to receiver 46 which is transmitted to processor 40. In response to receiving this signal, and according to instructions stored in memory 42, processor 40 transmits a control signal to lock door locks 26. Processor 40 also transmits a control signal to brake lights 48 thereby causing brake lights 48 to flash a single time (or in other embodiments twice, three times or more) which provides a visual indication to the user that the wireless signal was received and the door locks 26 have been locked. Through its connection to vehicle wiring system 38 through vehicle trailer wiring harness 50, bed light and tailgate lock controller 12 receives the control signals causing brake lights 48 to flash. More specifically, processor 72 of bed light and tailgate lock controller 12 receives the control signal (which is a flash of the brake lights 48). Processor 72 processes reception of the control signal (which is a flash of the brake lights 48) according to instructions stored in memory 74 and outputs a result. In this case, the result is an electronic signal to lock mechanism 106 locking the tailgate 34 through tailgate lock system 16. More specifically, the actuator of lock mechanism 106 is actuated to lock tailgate 34

In an alternative arrangement, when the tailgate lock is in an unlocked state, the bed light and tailgate lock controller 12 locks tailgate lock system 16 in response to receiving a control signal on backup light lead 57A. Processor 72 interprets the control signal on backup light lead 57A as an indication that the vehicle is about to travel and therefore locks the tailgate 34 so as to increase security and prevent the tailgate 34 from being removed or lowered, either intentionally or unintentionally when the vehicle 18 is in drive.

In an alternative arrangement, when the tailgate lock is in an unlocked state, the bed light and tailgate lock controller 12 locks tailgate lock system 16 in response to receiving a control signal on both brake light leads 57D and 57E) simultaneously (which is a brake light control signal). Processor 72 interprets the control signal on both brake light leads 57D and 57E as an indication that the vehicle is about to travel and therefore locks the tailgate 34 so as to increase security and prevent the tailgate 34 from being removed or lowered, either intentionally or unintentionally. In one arrangement, the processor 72 is configured to detect the duration of the simultaneous illumination of brake lights 48 to determine if the flash is a qualifying flash (such as a press of lock button 60) or an elongated depression of brake pedal 24, or any other signal.

When manual switch 102 is depressed for more than a predetermined amount of time a second function is performed, such as locking tailgate lock system 16.

Any number of presses of lock button 60 on wireless control 58 may be used to cause operation of lock mechanism 106, such as one two, three, four or more.

Unlock Function:

When the unlock button 62 on wireless control 58 is pressed a single time, a wireless signal is transmitted over the air to antenna 44 of vehicle 18, which is transmitted to receiver 46 which is transmitted to processor 40. In response to receiving this signal, and according to instructions stored in memory 42, processor 40 transmits a control signal to unlock lock door locks 26. Processor 40 also transmits a control signal to brake lights 48 thereby causing brake lights 48 to flash two times (or in other embodiments once, three times or more) which provides a visual indication to the user that the wireless signal was received and the door locks 26 have been unlocked. Through its connection to vehicle wiring system 38 through vehicle trailer wiring harness 50, bed light and tailgate lock controller 12 receives the control signals causing brake lights 48 to flash. More specifically, processor 72 of bed light and tailgate lock controller 12 receives the control signals (which are two flashes of the brake lights 48). Processor 72 processes reception of the control signal (which is two flash of the brake lights 48) according to instructions stored in memory 74 and outputs a result. In this case, the result is an electronic signal to lock mechanism 106 unlocking the tailgate 34 through tailgate lock system 16.

When manual switch 102 is depressed for more than a predetermined amount of time a second function is performed, such unlocking tailgate lock system 16.

Any number of presses of unlock button 62 on wireless control 58 may be used to cause operation of lock mechanism 106, such as one two, three, four or more.

Lock/Unlock Toggle Function:

In an alternative arrangement, instead of the relying upon a single flash or a double flash to determine whether to lock or unlock tailgate 34, processor 72 is configured to toggle between a locked position and a locked position every time the brake lights flash. That is, when a qualifying flash of brake lights 48 is received, the processor 72 is configured to cause the lock mechanism 106 to move in the opposite direction as the last movement (that is from locked to unlocked, or alternatively, from unlocked to locked).

Illumination Function:

In one arrangement, each time the tailgate 34 is locked or unlocked, indicating activity around the vehicle 18, processor 72, according to instructions stored in memory 74, transmits an electronic signal to bed light system 14 illuminating lights 92. This illumination continues for a predetermined amount of time (e.g. a timer function) before processor 72 terminates illumination.

In another arrangement, when the unlock button 62 of wireless control 58 is pressed two times, processor 72 of bed light and tailgate lock controller 12 receives the control signals (which are two flashes of the brake lights 48). Processor 72 processes reception of the control signal (which is two flashes of the brake lights 48) according to instructions stored in memory 74 and outputs a result. In this case, the result is an electronic signal to bed light system 14 causing illumination of lights 92.

Any other number of presses of unlock button 62 and/or lock button 60 of wireless control 58 may be used to illuminate bed light system 14.

Termination of Illumination—by Pressing Brake Pedal:

In one arrangement, if, while lights 92 are illuminated, brake pedal 24 is depressed, causing a control signal to be transmitted to bed light and tailgate lock controller 12, which in this case is an elongated brake light illumination (as opposed to a flash of the brake lights 48) the bed light and tailgate lock controller 12 terminates illumination of lights 92. This functionality prevents the bed light system 14 from being illuminated while vehicle 18 is driven. A depression of brake pedal 24 causes an elongated illumination of brake lights 48 that is longer than the flash caused by a press of unlock button 62 and/or lock button 60 of wireless control 58 and this difference is detected and interpreted by processor 72 of bed light and tailgate lock controller 12.

Termination of Illumination—Reverse Lights:

in one arrangement, when bed light system 14 is illuminated, the bed light and tailgate lock controller 12 terminates illumination in response to receiving a control signal on backup light lead 57A. Processor 72 interprets the control signal on backup light lead 57A as an indication that the vehicle is about to travel and therefore turns off lights 92.

Termination of Illumination—Lock Button Press:

In one arrangement, when the lock button 60 of wireless control 58 is pressed a single time, processor 72 of bed light and tailgate lock controller 12 receives the control signals (which is a single flash of the brake lights 48). Processor 72 processes reception of the control signal (which is a single flash of the brake lights 48) according to instructions stored in memory 74 and outputs a result. In this case, the result is an electronic signal to bed light system 14 terminating illumination of lights 92. This termination may be immediate, or it may be after a predetermined amount of time, such as one second, two seconds, fifteen seconds, thirty seconds or the like.

Illumination by Manual Switch:

In one arrangement, wherein bed light system 14 includes a manual switch 102, when lights 92 are in a non-illuminated condition and the manual switch 102 (or button) is actuated (or depressed) lights 92 are illuminated. This illumination continues for a predetermined amount of time (e.g. a timer function) before processor 72 terminates illumination at which point the manual switch 102 must be actuated again to turn lights 92 back on.

In an alternative arrangement, when manual switch 102 is actuated, lights 92 remain illuminated until manual switch 102 is actuated again or deactivated.

In yet another alternative arrangement, manual switch 102 is a two position switch. In this arrangement, when manual switch 102 is actuated to a first position, the lights 92 are illuminated for a predetermined amount of time before processor 72 automatically terminates illumination. In this arrangement, when manual switch 102 is actuated to a second position, the lights 92 are illuminated until the manual switch 102 is actuated and the second position is terminated.

In one arrangement, when lights 92 are illuminated by manual switch 102, even when in a second position, and brake pedal 24 is depressed, processor 72 terminates illumination of lights 92 so as to prevent driving while lights 92 are illuminated.

Any other manner of terminating illumination of bed light system 14 is hereby contemplated for use.

Power Port:

In one arrangement, power port 104 is powered continuously.

In another arrangement, power port 104 is powered for periodic intervals in response to actuation of manual switch 102.

In another arrangement, power port 104 is powered simultaneously with illumination of lights 92.

In another arrangement, power port 104 is powered in response to the unlock button 62 of wireless control 58 being pressed a predetermined number of times, such as one, two, three or more times. When the unlock button 62 of wireless control 58 is pressed the predetermined number of times, processor 72 of bed light and tailgate lock controller 12 receives the control signals (which are two flashes of the brake lights 48). Processor 72 processes reception of the control signal (which is two flashes, or any other number of flashes of the brake lights 48) according to instructions stored in memory 74 and outputs a result. In this case, the result is an electronic signal to bed light system 14 causing power to be supplied to power port 104.

Like lights 92, power to power port 104 is terminated upon the brake pedal 24 being depressed or any other manner described herein.

Any other manner or method of operation is hereby contemplated for use in addition to the above examples. As is apparent from the above, the system 10 presented herein provides unique advantages as it provides automatic control of a bed light system 14 and a tailgate lock system 16.

Secondary Wiring Harness:

When bed light and tailgate lock controller 12 is connected to vehicle wiring system 38 through connection to vehicle trailer wiring harness 50 this connection prevents trailer 52 from being connected to vehicle trailer wiring harness 50. To resolve this problem, and to facilitate connection of both bed light and tailgate lock controller 12 as well as trailer 52 to vehicle wiring system 38, a secondary vehicle trailer wiring harness 118 is connected to bed light and tailgate lock controller 12. In this arrangement, the bed light and tailgate lock controller 12 merely acts as a pass-through and allows trailer 52 to connect to secondary vehicle trailer wiring harness 118 which connects to bed light and tailgate lock controller 12 which connects to vehicle wiring system 38. This arrangement allows for both trailer 52 and bed light and tailgate lock controller 12 to be simultaneously connected to vehicle wiring system 38 through bed light and tailgate lock controller 12. Said another way, by having a secondary vehicle trailer wiring harness 118 connected to bed light and tailgate lock controller 12 this eliminates the need to disconnect bed light and tailgate lock controller 12 from vehicle trailer wiring harness 50 every time a trailer 52 is attached to vehicle 18 and needs to be connected to vehicle trailer wiring harness 50. In this way, the addition of a secondary vehicle trailer wiring harness 118 improves the functionality of system 10. Like vehicle trailer wiring harness 50, secondary vehicle trailer wiring harness 118 includes an electrical lead 120 that terminates at a connector 122. In one arrangement, the connector 122 is similar to, if not identical to, the connector 56 of vehicle trailer wiring harness 50 so that the connector 122 replaces and may be used in place of the connector 56. In an alternative arrangement, connector 122 is a different configuration from the connector 56 of vehicle trailer wiring harness 50.

Tailgate Pull Handle Actuator:

In addition to illuminating bed 28, locking and unlocking tailgate 34 and providing power at power port 104, in one arrangement, bed illumination and tailgate lock system 10 also includes the ability to lower tailgate 34. This is ability to remotely lower tailgate 34 is particularly useful in vehicles 18 that have a slow-lower tailgate 34, which is an arrangement wherein the tailgate 34 slowly lowers once the socket 114 and post 116 are released (such as a manual or motorized pull of handle 112). In this arrangement, bed light and tailgate lock controller 12 includes a tailgate pull handle connector 154 that electrically connects to a tailgate pull handle actuator 156 through electrical connection to a tailgate pull handle connector 158 of tailgate pull handle actuator 156. In one arrangement, tailgate pull handle connector 154 may be formed of any form of a socket or plug or connection that mates with a corresponding tailgate pull handle connector 158 of tailgate pull handle actuator 156 that facilitates the quick and easy and durable electrical connection to and control of tailgate pull handle actuator 156. When an operative control signal is transmitted to the bed light and tailgate lock controller 12, a signal is transmitted through the connection of tailgate pull handle connector 154 to tailgate pull handle connector 158 and tailgate pull handle actuator 156 is actuated. When actuated, tailgate pull handle actuator 156 has the effect of pulling handle 112 of tailgate 34 thereby causing socket 114 to release from post 116 which causes the tailgate 34 to automatically lower under the force of gravity and/or under the bias force of an auto-lowering mechanism (e.g. slow-lower or slow close device) operatively attached to the tailgate 34.

Tailgate pull handle actuator 156 is any device which facilitates disengagement of tailgate 34 so as to facilitate lowering of tailgate 34 and may be formed of any device that converts electrical power into motion such as an electro magnet, a solenoid, a motor, or the like systems. In one arrangement, lock mechanism 106 and tailgate pull handle actuator 156 are identical or similar electrical components. In one arrangement, lock mechanism 106 and tailgate pull handle actuator 156 are separate electrical components. In another arrangement, lock mechanism 106 and tailgate pull handle actuator 156 are the same electrical component that facilitates dual functionality of locking/unlocking tailgate 34 as well as lowering tailgate 34. Like lock mechanism 106, tailgate pull handle actuator 156 is installed within tailgate 34 and is operatively connected to socket 114 and any other component of tailgate 34 that is needed to facilitate the release and lowering of tailgate 34.

Direct Wiring:

In one arrangement, as is described herein, it is desirable to connect bed illumination and tailgate lock system 10 to vehicle wiring system 38 through vehicle trailer wiring harness 50 because it is quick, convenient, and easily accessible near the rear of the vehicle 18. Another benefit of connecting bed illumination and tailgate lock system 10 to vehicle wiring system 38 through vehicle trailer wiring harness 50 is that this avoids having to run additional wires through or to other portions of the vehicle 18, such as into the passenger compartment, to the fuse box, under the hood, to the battery, or to other portions of the vehicle 18, which can be a substantial hassle as well as cost.

However, one drawback of connecting bed illumination and tailgate lock system 10 to vehicle wiring system 38 through vehicle trailer wiring harness 50 is that the bed illumination and tailgate lock system 10 is limited to deciphering how to operate the lights 92, lock mechanism 106, power port 104, and tailgate pull handle actuator 156 based on the signals that are transmitted to and through the vehicle trailer wiring harness 50 which are not necessarily intended to be used to control operation of bed light system 14 and tailgate lock system 16 (which includes locking/unlocking as well as lowering tailgate 34). In addition, another drawback of connecting bed illumination and tailgate lock system 10 to vehicle wiring system 38 through vehicle trailer wiring harness 50 is that the signals and operation of vehicle trailer wiring harness 50 may vary from vehicle 18 to vehicle 18. That is, some vehicles 18 that have a vehicle trailer wiring harness 50 do not have constant power at the vehicle trailer wiring harness 50, which poses problems when connecting a bed illumination and tailgate lock system 10. Other vehicles 18 don't even include a vehicle trailer wiring harness 50. As such, in these instances it is needed and/or desirable to connect to the vehicle wiring system 38 in other ways.

In one arrangement, bed illumination and tailgate lock system 10 connects directly to ground 140 (which is known as negative voltage), battery 142 (which is known as positive voltage), ignition 144 (which is powered when the ignition of vehicle 18 is powered), hazard 146 (which illuminates the hazard lights), unlock 148 (which is powered when an unlock signal is transmitted to unlock door locks 26), lock 150 (which is powered when a lock signal is transmitted to lock door locks 26), and buzzer 152 (which is powered to transmit an audible indication to the user when the vehicle 18 is locked, such as the beep of the horn or other audible indicator). Connection to these components, ground 140, battery 142, ignition 144, hazard 146, unlock 148, lock 150, and buzzer 152, may be made by connecting to any portion of the vehicle wiring system 38 such as tapping into wires directly, tapping into the fuse box of the vehicle 18, or by connecting to any other portion of the vehicle wiring system 38. While making an electrical connection to these components (ground 140, battery 142, ignition 144, hazard 146, unlock 148, lock 150, and buzzer 152), may be inconvenient, more time consuming, more costly and more difficult than simply plugging into an existing connector 56 of an existing vehicle trailer wiring harness 50, making connection to these components (ground 140, battery 142, ignition 144, hazard 146, unlock 148, lock 150, and buzzer 152), provides an ability to control bed illumination and tailgate lock system 10 in a more accurate manner and eliminates the need to interpret flashes of brake lights 48 to control the operation of lights 92, lock mechanism 106, power port 104, and tailgate pull handle actuator 156. In this way, while directly wiring to these components (ground 140, battery 142, ignition 144, hazard 146, unlock 148, lock 150, and buzzer 152) may add complexity in installation, it reduces complexity in control and increases the confidence in ensuring that the lights 92, lock mechanism 106, power port 104, and tailgate pull handle actuator 156 are actuated, and perhaps more importantly, not actuated, when desired.

While the term "directly connected" or "connects directly" is used herein, this is not to mean that the connection must be made directly to the described component. Instead, the term directly connected as used herein is intended to mean connected by any manner, method or means and may be connected to wires or leads or intermediary components that connect to the described source and/or carry the desired control signals. The term "directly connected" or "connects directly" is intended to describe a connection that is individual in nature and/or not connected through vehicle trailer wiring harness 50 and instead a separate connection is made outside of vehicle trailer wiring harness 50.

In one arrangement, bed light and tailgate lock controller 12 connects directly to ground 140 and battery 142. This direct connection to ground 140 and battery 142 ensures that bed light and tailgate lock controller 12 has constant power and/or power when needed. This connection ensures robust operation and eliminates the sensitivity to some vehicles 18 where constant power is not present at vehicle trailer wiring harness 50. These connections to ground 140 and battery 142 may be made by directly wiring to the negative (ground 140) and the positive (battery 142) of the battery of the vehicle 18. Alternatively, these connections to ground 140 and battery 142 may be made by directly wiring to the fuse box of vehicle 18. Alternatively, these connections to ground 140 and battery 142 may be made by directly wiring to electrical leads of vehicle wiring system 38 that carry these signals. Any other manner or method or means of connecting to ground 140 and battery 142 is hereby contemplated for use.

In one arrangement, bed light and tailgate lock controller 12 connects directly to ignition 144. Ignition 144 is powered when the ignition of vehicle 18 is on and is used as a signal by many electronic components of vehicle 18 to either power on, power off or otherwise control operation of the connected electronic component. This direct connection to ignition 144 provides bed light and tailgate lock controller 12 an ability to understand when the ignition of vehicle 18 is on and when it is off and this allows the bed light and tailgate lock controller 12 to control the lights 92, lock mechanism 106, power port 104, and tailgate pull handle actuator 156 accordingly. Connecting to ignition 144 may be made by directly wiring to the ignition of vehicle 18. Alternatively, connecting to ignition 144 may be made by directly wiring to the fuse box of vehicle 18. Alternatively, connecting to ignition 144 may be made by directly wiring to electrical leads of vehicle wiring system 38 that carry these signals. Any other manner or method or means of connecting to ignition 144 is hereby contemplated for use.

In one arrangement, by connecting to the signal of ignition 144 bed light and tailgate lock controller 12 can determine to enable or disable certain functionality based on whether the ignition 144 is on. In one arrangement, bed light and tailgate lock controller 12 disables the ability to activate the tailgate pull handle actuator 156 when a signal or power is provided to ignition 144 thereby preventing the tailgate 34 from being dropped while the ignition 144 is on (so as to prevent the tailgate 34 from being dropped while the vehicle 18 is driving). In one arrangement, bed light and tailgate lock controller 12 disables the ability to activate the lock mechanism 106 when a signal or power is provided to ignition 144 thereby preventing the tailgate 34 from being unlocked while the ignition 144 is on (so as to prevent the tailgate 34 from being opened while the vehicle 18 is driving). In one arrangement, bed light and tailgate lock controller 12 disables or turns off lights 92 when a signal or power is provided to ignition 144 thereby preventing the lights 92 from being on while the ignition 144 is on (so as to prevent the lights 92 from being on while the vehicle 18 is driving). The use of a signal from ignition 144 may be used in any other manner to control operation of bed light and tailgate lock controller 12.

In one arrangement, bed light and tailgate lock controller 12 connects directly to hazard 146. Hazard 146 is powered or receives a signal when the hazard lights of vehicle 18 are illuminated, which is the same as, in many cases, as a simultaneous illumination of left and right brake lights, as well as other lights (such as parking lights, head lights, turn signal marker lights, or the like). In some vehicles 18, when the vehicle 18 is remotely locked or unlocked a signal is transmitted to hazard 146 to flash the hazard lights once, twice, three times or any other number of times. This direct connection to hazard 146 provides bed light and tailgate lock controller 12 an ability to understand when the lights of hazard 146 are flashing which allows bed light and tailgate lock controller 12 to control the lights 92, lock mechanism 106, power port 104, and tailgate pull handle actuator 156 accordingly. Connecting to hazard 146 may be made by directly wiring to the line of hazard 146. Alternatively, connecting to hazard 146 may be made by directly wiring to the fuse box of vehicle 18. Alternatively, connecting to hazard 146 may be made by directly wiring to electrical leads of vehicle wiring system 38 that carry these signals. Any other manner or method or means of connecting to ignition 144 is hereby contemplated for use.

In one arrangement, bed light and tailgate lock controller 12 connects directly to unlock 148. Unlock 148 is powered or receives a signal when the vehicle 18 is to be unlocked, such as in response to receiving a press of the unlock button 62 of wireless control 58. This direct connection to unlock 148 provides bed light and tailgate lock controller 12 an ability to understand when the door locks 26 are moved to an unlocked state which allows bed light and tailgate lock controller 12 to control the lights 92, lock mechanism 106, power port 104, and tailgate pull handle actuator 156 accordingly. Connecting to unlock 148 may be made by directly wiring to the unlock line of vehicle 18. Alternatively, connecting to unlock 148 may be made by directly wiring to the fuse box of vehicle 18. Alternatively, connecting to unlock 148 may be made by directly wiring to electrical leads of vehicle wiring system 38 that carry these signals. Any other manner or method or means of connecting to ignition 144 is hereby contemplated for use.

In one arrangement, by connecting to the signal of unlock 148 bed light and tailgate lock controller 12 can determine to enable or disable certain functionality based on whether the vehicle 148 is unlocked. In one arrangement, bed light and tailgate lock controller 12 enables the ability to activate the tailgate pull handle actuator 156 when a signal or power is provided to unlock 148 thereby allowing the tailgate 34 from being dropped only while the vehicle 18 is unlocked. In one arrangement, bed light and tailgate lock controller 12 enables the ability to activate the lock mechanism 106 and unlock the tailgate 34 when a signal or power is provided to unlock 148 thereby allowing the tailgate 34 to be unlocked while the vehicle 18 is unlocked. In one arrangement, bed light and tailgate lock controller 12 enables or turns on lights 92 when a signal or power is provided to unlock 148 thereby only allowing the lights 92 to be on when the vehicle 18 is unlocked. The use of a signal from unlock may be used in any other manner to control operation of bed light and tailgate lock controller 12.

In one arrangement, bed light and tailgate lock controller 12 connects directly to lock 150. Lock 150 is powered or receives a signal when the vehicle 18 is to be locked, such as in response to receiving a press of the lock button 60 of wireless control 58. This direct connection to lock 150 provides bed light and tailgate lock controller 12 an ability to understand when the door locks 26 are moved to a locked state which allows bed light and tailgate lock controller 12 to control the lights 92, lock mechanism 106, power port 104, and tailgate pull handle actuator 156 accordingly. Connecting to lock 150 may be made by directly wiring to the lock line of vehicle 18. Alternatively, connecting to lock 150 may be made by directly wiring to the fuse box of vehicle 18. Alternatively, connecting to lock 150 may be made by directly wiring to electrical leads of vehicle wiring system 38 that carry these signals. Any other manner or method or means of connecting to ignition 144 is hereby contemplated for use In one arrangement, by connecting to the signal of lock 150 bed light and tailgate lock controller 12 can determine to enable or disable certain functionality based on whether the vehicle 148 is locked. In one arrangement, bed light and tailgate lock controller 12 disables the ability to activate the tailgate pull handle actuator 156 when a signal or power is provided to lock 150 thereby preventing the tailgate 34 from being dropped only while the vehicle 18 is locked. In one arrangement, bed light and tailgate lock controller 12 disables the ability to activate the lock mechanism 106 and unlock the tailgate 34 when a signal or power is provided to lock 150 thereby preventing the tailgate 34 to be unlocked while the vehicle 18 is locked. In one arrangement, bed light and tailgate lock controller 12 disables or turns of lights 92 when a signal or power is provided to lock 150 thereby only allowing the lights 92 to be on when the vehicle 18 is unlocked. The use of a signal from lock 150 may be used in any other manner to control operation of bed light and tailgate lock controller 12.

In one arrangement, bed light and tailgate lock controller 12 connects directly to buzzer 152. Buzzer 152 is any device that transmits an audible indication, such as a beep, a buzz or any other sound or noise that is used to indicate that the vehicle 18 has been locked. In one arrangement, a signal is transmitted on buzzer 152 in response to a first, second or third or otherwise press of a lock button 60 of wireless control 58 within a predetermined amount of time or in a predetermined sequence. This audible signal from buzzer 152 provides an audible confirmation that the vehicle 18 has been locked. Buzzer 152 is powered when the ignition of vehicle 18 is off and when the vehicle 18 is locked. This direct connection to buzzer 152 (or buzzer line) provides bed light and tailgate lock controller 12 an ability to understand when the vehicle 18 is locked. In many vehicles 18 audible indication is sent through buzzer 152 only when the vehicle 18 is locked (and not when the vehicle 18 is unlocked). As such, connecting to buzzer 152 is a cleaner or more accurate way of determining whether the vehicle 18 is locked or unlocked. Or, said another way, connecting to buzzer 152 provides a higher level of confidence as to how to control operation of the bed illumination and tailgate lock system 10 because a signal is only transmitted to buzzer 152 when the vehicle 18 is locked. In contrast, when connecting to brake lights 48, flashes of the brake lights 48 are identical whether the vehicle 18 is being locked or unlocked. As such, connection to buzzer 152 allows the bed light and tailgate lock controller 12 to control the lights 92, lock mechanism 106, power port 104, and tailgate pull handle actuator 156 in a more accurate manner than simply connecting to brake lights 48. Connecting to buzzer 152 may be made by directly wiring to the buzzer of vehicle 18. Alternatively, connecting to buzzer 152 may be made by directly wiring to the fuse box of vehicle 18. Alternatively, connecting to buzzer 152 may be made by directly wiring to electrical leads of vehicle wiring system 38 that carry these signals. Any other manner or method or means of connecting to buzzer 152 is hereby contemplated for use.

In one arrangement, by connecting to the signal of buzzer 152 bed light and tailgate lock controller 12 can determine to enable or disable certain functionality based on whether the buzzer 152 has received a signal or is powered. In one arrangement, bed light and tailgate lock controller 12 disables the ability to activate the tailgate pull handle actuator 156 when a signal or power is provided to buzzer 152 thereby preventing the tailgate 34 from being dropped while the vehicle 18 is locked. In one arrangement, bed light and tailgate lock controller 12 disables the ability to activate the lock mechanism 106 when a signal or power is provided to buzzer 152 thereby preventing the tailgate 34 from being unlocked while the vehicle 18 is locked. In one arrangement, bed light and tailgate lock controller 12 disables or turns off lights 92 when a signal or power is provided to buzzer 152 thereby preventing the lights 92 from being on while the vehicle 18 is locked. The use of a signal from buzzer 152 may be used in any other manner to control operation of bed light and tailgate lock controller 12.

Bed light and tailgate lock controller 12 may be directly or indirectly connected to any other component of vehicle control system 36 so as to facilitate control and operation of bed light and tailgate lock controller 12. In one arrangement, bed light and tailgate lock controller 12 is connected to brake lights 48. This allows the bed light and tailgate lock controller 12 to determine when the brake lights 48 are depressed for an elongated amount of time (which is an indication that the vehicle 18 is being driven) thereby allowing the bed light and tailgate lock controller 12 to prevent unlocking and lowering of the tailgate 34 and illumination of lights 92

In one arrangement, bed light and tailgate lock controller 12 is connected to the transmission of vehicle 18 and/or the gear shift of vehicle 18. This allows the bed light and tailgate lock controller 12 to determine what gear the vehicle 18 is in thereby allowing the bed light and tailgate lock controller 12 to prevent unlocking and lowering of the tailgate 34 and illumination of lights 92 when the vehicle 18 is in anything other than park. Or, said another way, by connecting bed light and tailgate lock controller 12 to the transmission of vehicle 18 and/or the gear shift of vehicle 18 this allows the bed light and tailgate lock controller 12 to allow unlocking and lowering of the tailgate 34 and illumination of lights 92 when the vehicle 18 is in park.

Use Case—Direct Wired to Ground and Battery:

In addition to the above-described manners of operation, in one arrangement, bed light and tailgate lock controller 12 is electrically connected to ground 140 and battery 142. This electrical connection ensures that power is provided to bed light and tailgate lock controller 12 so long as battery 142 has power. This direct connection to ground 140 and battery 142 eliminates the possibility that power cuts to the bed light and tailgate lock controller 12 thereby ensuring consistent operation of the bed light and tailgate lock system 10.

Use Case—Direct Wired Ignition:

In addition to the above-described manners of operation, in one arrangement, wherein bed light and tailgate lock controller 12 is electrically connected to ignition 144, when power is sensed by bed light and tailgate lock controller 12 on ignition 144 the bed light and tailgate lock controller 12 the unlock function of lock mechanism 106 is disabled preventing the tailgate 34 from being unlocked when the ignition 144 is powered. In addition, the tailgate pull handle actuator 156 is also disabled preventing the tailgate 34 from being lowered when the ignition 144 is powered. In addition, the bed lights 92 are also disabled preventing the bed lights 92 from being illuminated when the ignition 144 is powered. In this way, electrically connecting bed light and tailgate lock controller 12 to ignition 144 ensures that the tailgate 34 is not unlocked or lowered and that the bed lights 92 are not illuminated when the vehicle 18 is driving.

Use Case—Hazard Lights:

In addition to the above-described manners of operation, in one arrangement, wherein bed light and tailgate lock controller 12 is electrically connected to hazard 146, or hazard lights, when power is sensed by bed light and tailgate lock controller 12 on hazard 146, which is often the flash of the hazard lights, the algorithm used by the processor 72 interprets these signals and in response outputs control signals thereby controlling operation of the lock mechanism 106, tailgate pull handle actuator 156 and bed lights 92 accordingly. That is, when the appropriate number of flashes occur at the proper timing on hazard 146 to lock the vehicle 18, the lock mechanism 106 locks tailgate 34. And, when the appropriate number of flashes occur at the proper timing on hazard 146 to unlock the vehicle 18, the lock mechanism 106 unlocks tailgate 34. And, when the appropriate number of flashes occur at the proper timing on hazard 146 to lower the tailgate 34, the tailgate pull handle actuator 156 is actuated thereby lowering the tailgate 34. Different vehicles 18 operate hazards 146 differently. To accommodate this variability, the algorithm of bed light and tailgate lock controller 12 is programmed to accommodate these variations between vehicles 18.

Use Case—Lock and Unlock:

In addition to the above-described manners of operation, in one arrangement, wherein bed light and tailgate lock controller 12 is electrically connected to lock 150 (which is the line that power and/or a signal is transmitted on when the vehicle 18 is to be locked), when power is sensed by bed light and tailgate lock controller 12 on lock 150 the bed light and tailgate lock controller 12 lock the lock mechanism 106 thereby preventing the tailgate 34 from being unlocked. In addition, the tailgate pull handle actuator 156 is disabled preventing the tailgate 34 from being lowered when a signal is detected on lock 150. In addition, power to the bed lights 92 is cut, either immediately or after a predetermined amount of time. In this way, electrically connecting bed light and tailgate lock controller 12 to lock 150 ensures that the tailgate 34 is not unlocked or lowered and that the bed lights 92 are not illuminated when the vehicle 18 locked.

In addition to the above-described manners of operation, in one arrangement, wherein bed light and tailgate lock controller 12 is electrically connected to unlock 152 (which is the line that power and/or a signal is transmitted on when the vehicle 18 is to be unlocked), when power is sensed by bed light and tailgate lock controller 12 on unlock 152 the bed light and tailgate lock controller 12 unlock the lock mechanism 106. In addition, in one arrangement, when an additional signal is detected by the bed light and tailgate lock controller 12 within a predetermined amount of time from the first signal (e.g. two, three, four or more unlock signals within rapid succession), the tailgate pull handle actuator 156 is activated thereby lowering the tailgate 34. In addition, power to the bed lights 92 is applied, thereby illuminating bed lights 92, either for a predetermined amount of time or until another condition occurs (such as a signal on lock 150).

Use Case—Buzzer:

In addition to the above-described manners of operation, in one arrangement, wherein bed light and tailgate lock controller 12 is electrically connected to buzzer 152, when power is sensed by bed light and tailgate lock controller 12 on buzzer 152 the bed light and tailgate lock controller 12 the unlock function of lock mechanism 106 is disabled preventing the tailgate 34 from being unlocked when the buzzer 152 has been powered (until a change of state, such as an unlock signal on unlock 148). In addition, the tailgate pull handle actuator 156 is also disabled preventing the tailgate 34 from being lowered when the buzzer 152 has been powered (until a change of state, such as an unlock signal on unlock 148). In addition, the bed lights 92 are turned off or disabled, either immediately or after a predetermined amount of time, preventing the bed lights 92 from being illuminated when the buzzer 152 has been powered (until a change of state, such as an unlock signal on unlock 148). In this way, electrically connecting bed light and tailgate lock controller 12 to buzzer 152 ensures that the tailgate 34 is not unlocked or lowered and that the bed lights 92 are not illuminated after the buzzer 152 has been activated (and until a change of state, such as an unlock signal on unlock 148).

Redundant Signals:

Various arrangements have been presented herein wherein bed light and tailgate lock controller 12 is connected to various control signals such as through the connection to vehicle trailer wiring harness 50, ignition 144, hazard 146, unlock 148, lock 150 and buzzer 152, among others. Through these connections and control signals received there through, bed light and tailgate lock controller 12, through the use of processor 72 and memory 74 and software, code, algorithms or the like, determines how to control operation of bed lights 92, tailgate lock mechanism 106 and tailgate pull handle actuator 156, among other components. Bed light and tailgate lock controller 12 may be connected to any of, or all of, vehicle trailer wiring harness 50, ignition 144, hazard 146, unlock 148, lock 150 and buzzer 152, as well as ground 140 and battery 142. That is, bed light and tailgate lock controller 12 may be connected to redundant systems so as to ensure proper operation of bed lights 92, tailgate lock mechanism 106 and tailgate pull handle actuator 156, and perhaps more importantly, prevent improper operation of bed lights 92, tailgate lock mechanism 106 and tailgate pull handle actuator 156. In one arrangement, when conflicting signals are received, the bed lights 92 are turned off, lock mechanism 106 is locked and/or tailgate pull handle actuator 156 is deactivated. And, only when all signals correspond with one another does the bed lights 92 illuminate, the lock mechanism 106 unlock and/or the tailgate pull handle actuator 156 activate. In this way, multiple or redundant connections to various signals ensures that proper operation occurs and improper operation does not occur.

From the above discussion and the accompanying drawings and claims it will be appreciated that the bed illumination and tailgate lock system and method of use presented herein offers many advantages over the prior art. That is, the bed illumination and tailgate lock system and method of use presented: improves upon the state of the art; has a long useful life; can be used on practically any pickup truck; is easy to; improves efficiency; is easy to use; improves the safety of the vehicle; provides improved bed illumination; provides improved tailgate security; prevents the tailgate from being stolen or vandalized; works intuitively; can be controlled remotely; facilitates manual control of illumination; provides accessory power in the bed; can be connected to a conventional vehicle trailer wiring harness; can be connected to practically any vehicle's electrical system; provides multi-purpose functionality; solves bed illumination and tailgate locking problems in one system; improves safety; has a long useful life; is durable; is rugged; can withstand the elements; and provides value, utility and novelty to the user, among countless other improvements and advantages.

It will be appreciated by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included within the spirit and purview of this application.

What is claimed:

1. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;
the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;
the tailgate pull handle actuator electrically connected to the bed light and tailgate lock controller;
wherein the tailgate pull handle actuator is configured to release the tailgate so as to allow it to move from the closed position to the lowered position;
wherein the bed light and tailgate lock controller controls operation of the bed light system, the tailgate lock actuator and the tailgate pull handle actuator in response to receiving control signals from the vehicle wiring system;
wherein when door locks of the pickup truck are remotely unlocked using a wireless control, the bed light and tailgate lock controller illuminates the bed light system.

2. The system of claim 1, wherein the control signals are brake light impulses.

3. The system of claim 1, wherein the control signals are backup light impulses.

4. The system of claim 1, wherein the control signals are ignition signals.

5. The system of claim 1, wherein the control signals are hazard signals.

6. The system of claim 1, wherein the control signals are unlock signals.

7. The system of claim 1, wherein the control signals are lock signals.

8. The system of claim 1, wherein the control signals are buzzer signals.

9. The system of claim 1, further comprising:
the pickup truck having door locks electrically connected to the vehicle wiring system;
a wireless control wirelessly connected to the vehicle control system;
the wireless control configured to remotely lock and unlock the door locks of the pickup truck;
wherein when the wireless control remotely locks or unlocks the door locks of the pickup truck, control signals are transmitted to the bed light and tailgate lock controller which are used to control operation of the bed light system, the tailgate lock actuator and the tailgate pull handle actuator.

10. The system of claim 1, wherein when door locks of the pickup truck are remotely unlocked using a wireless control, the bed light and tailgate lock controller unlocks the tailgate lock system.

11. The system of claim 1, wherein when door locks of the pickup truck are remotely locked using a wireless control, the bed light and tailgate lock controller locks the tailgate lock system.

12. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;
the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;
the tailgate pull handle actuator electrically connected to the bed light and tailgate lock controller;
wherein the tailgate pull handle actuator is configured to release the tailgate so as to allow it to move from the closed position to the lowered position;
wherein the bed light and tailgate lock controller controls operation of the bed light system, the tailgate lock actuator and the tailgate pull handle actuator in response to receiving control signals from the vehicle wiring system;
wherein when door locks of the pickup truck are remotely locked using a wireless control, the bed light and tailgate lock controller illuminates the bed light system for a predetermined amount of time.

13. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;

the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;
the tailgate pull handle actuator electrically connected to the bed light and tailgate lock controller;
wherein the tailgate pull handle actuator is configured to release the tailgate so as to allow it to move from the closed position to the lowered position;
wherein the bed light and tailgate lock controller controls operation of the bed light system, the tailgate lock actuator and the tailgate pull handle actuator in response to receiving control signals from the vehicle wiring system;
wherein when door locks of the pickup truck are remotely locked using a wireless control, the bed light and tailgate lock controller illuminates the bed light system until a brake pedal is depressed.

14. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;
the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;
the tailgate pull handle actuator electrically connected to the bed light and tailgate lock controller;
wherein the tailgate pull handle actuator is configured to release the tailgate so as to allow it to move from the closed position to the lowered position;
wherein the bed light and tailgate lock controller controls operation of the bed light system, the tailgate lock actuator and the tailgate pull handle actuator in response to receiving control signals from the vehicle wiring system;
wherein the bed light and tailgate lock controller is electrically connected to the vehicle wiring system through connection to a vehicle trailer wiring harness.

15. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;
the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;
the tailgate pull handle actuator electrically connected to the bed light and tailgate lock controller;
wherein the tailgate pull handle actuator is configured to release the tailgate so as to allow it to move from the closed position to the lowered position;
wherein the bed light and tailgate lock controller controls operation of the bed light system, the tailgate lock actuator and the tailgate pull handle actuator in response to receiving control signals from the vehicle wiring system;
further comprising a manual switch electrically connected to the pickup truck bed illumination and tailgate lock system, wherein when the manual switch is actuated, the bed light system is illuminated.

16. A pickup truck bed illumination and tailgate lock system comprising:
a pickup truck;
the pickup truck having a bed and a tailgate;
wherein the tailgate is configured to move between a closed position and a lowered position;
the pickup truck having a vehicle wiring system;
the pickup truck having a vehicle control system electrically connected to a vehicle wiring system;
a bed light and tailgate lock controller;
the bed light and tailgate lock controller electrically connected to the vehicle wiring system and configured to receive power, ground and control signals from the vehicle wiring system;
a bed light system;
the bed light system electrically connected to the bed light and tailgate lock controller;
the bed light system configured to illuminate the bed;
a tailgate lock system;
the tailgate lock system electrically connected to the bed light and tailgate lock controller;
the tailgate lock system having a tailgate lock actuator;
wherein the tailgate lock actuator is configured to lock and unlock the tailgate;
a tailgate pull handle actuator;

the tailgate pull handle actuator electrically connected to the bed light and tailgate lock controller;

wherein the tailgate pull handle actuator is configured to release the tailgate so as to allow it to move from the closed position to the lowered position;

wherein the bed light and tailgate lock controller controls operation of the bed light system, the tailgate lock actuator and the tailgate pull handle actuator in response to receiving control signals from the vehicle wiring system;

further comprising a power port connected to the pickup truck bed illumination and tailgate lock system, the power port configured to provide power to electronic accessories.

17. A pickup truck bed illumination and tailgate lock system comprising:

a bed light and tailgate lock controller;

the bed light and tailgate lock controller electrically connected to an electrical system of a pickup truck;

wherein the bed light and tailgate lock controller is configured to receive power from the electrical system of the pickup truck;

wherein the bed light and tailgate lock controller is configured to receive control signals from the electrical system of the pickup truck;

a bed light system electrically connected to the bed light and tailgate lock controller;

the bed light system having a plurality of lights configured to illuminate a bed of a pickup truck;

a tailgate lock system electrically connected to the bed light and tailgate lock controller;

the tailgate lock system having a powered lock mechanism configured to lock and unlock a tailgate;

a tailgate pull handle actuator electrically connected to the bed light and tailgate lock controller;

the tailgate pull handle actuator having a powered actuator configured to release the tailgate so as to allow the tailgate to move from a closed position to a lowered position;

wherein the bed light and tailgate lock controller controls operation of the bed light system, the tailgate lock system and the tailgate pull handle actuator in response to control signals received from the electrical system of the pickup truck.

18. A pickup truck bed illumination and tailgate lock system comprising:

a bed light and tailgate lock controller;

a connector electrically connected to the bed light and tailgate lock controller;

a bed light system electrically connected to the bed light and tailgate lock controller;

the bed light system having a plurality of lights configured to illuminate a bed of a pickup truck;

a tailgate lock system electrically connected to the bed light and tailgate lock controller;

the tailgate lock system having a powered actuator configured to lock and unlock a tailgate of the pickup truck;

a tailgate pull handle actuator electrically connected to the bed light and tailgate lock controller;

the tailgate pull handle actuator having a powered actuator configured to release the tailgate so as to allow the tailgate to move from a closed position to a lowered position;

wherein the connector of the bed light and tailgate lock controller is electrically connected to a connector of a vehicle trailer wiring harness of the pickup truck;

wherein the bed light and tailgate lock controller receives control signals through the vehicle trailer wiring harness of the pickup truck;

wherein the bed light and tailgate lock controller controls operation of the bed light system, the tailgate lock system and the tailgate pull handle actuator in response to the control signals received through the vehicle trailer wiring harness.

\* \* \* \* \*